(12) United States Patent
Baxter et al.

(10) Patent No.: US 10,226,117 B1
(45) Date of Patent: Mar. 12, 2019

(54) HOLDER FOR PORTABLE ELECTRONIC DEVICE AND METHOD

(71) Applicant: Prop-It, LLC, Priest Lake, ID (US)

(72) Inventors: Jason E. Baxter, Spokane, WA (US); Bradley M. Gagnon, Priest Lake, ID (US)

(73) Assignee: Prop-it, LLC, Priest Lake, ID (US)

( * ) Notice: Subject to any disclaimer, the term of this patent is extended or adjusted under 35 U.S.C. 154(b) by 0 days.

(21) Appl. No.: 15/330,942

(22) Filed: Dec. 4, 2015

(51) Int. Cl.
| | |
|---|---|
| *A47G 29/00* | (2006.01) |
| *A45F 5/00* | (2006.01) |
| *F16M 11/04* | (2006.01) |
| *F16B 2/10* | (2006.01) |
| *F16B 2/18* | (2006.01) |

(52) U.S. Cl.
CPC ............... *A45F 5/00* (2013.01); *F16B 2/10* (2013.01); *F16B 2/18* (2013.01); *F16M 11/041* (2013.01)

(58) Field of Classification Search
USPC ....................................................... 248/126
See application file for complete search history.

(56) References Cited

U.S. PATENT DOCUMENTS

| | | | |
|---|---|---|---|
| 457,858 A | 8/1891 | Treen | |
| 2,525,985 A | 10/1950 | Weymouth | |
| 3,456,262 A | 7/1969 | Coon | |
| 4,956,895 A | 9/1990 | Hayasaka | |
| 5,261,583 A | 11/1993 | Long | |
| 5,325,570 A | 7/1994 | Chin-Ho | |
| 5,402,558 A | 4/1995 | Santapa | |
| 5,642,740 A | 7/1997 | Chen | |
| 5,651,633 A | 7/1997 | Howe | |
| 5,765,820 A * | 6/1998 | Marusiak | B25B 5/003 269/156 |
| 6,276,031 B1 | 8/2001 | Haiduk | |
| 6,490,767 B2 | 12/2002 | Haiduk | |
| 6,637,065 B2 | 10/2003 | Biggs | |
| 6,925,689 B2 | 8/2005 | Folkmar | |
| 6,932,309 B1 * | 8/2005 | Corey | B60R 11/0241 224/483 |
| 7,299,808 B2 | 11/2007 | Lau | |
| 7,513,472 B2 * | 4/2009 | Yang | F16M 11/041 224/197 |

(Continued)

OTHER PUBLICATIONS

2014—Joby MPOD Mini Stand—REI.com.pdf.*

*Primary Examiner* — Monica E Millner
(74) *Attorney, Agent, or Firm* — Wells St. John P.S.

(57) ABSTRACT

A holder for an electronic communications device is provided having a first clasping arm, a second clasping arm, and an elastic cord retainer. The first clasping arm has an articulating base member at a proximal end, an edge engagement portion at a distal end, and a receiving groove. The second clasping arm has a complementary articulating base member at a proximal end, an edge engagement portion at a distal end, and a receiving groove. The base member of the second clasping arm cooperates in assembly with the base member of the first clasping arm to define an articulating joint with the receiving groove of the first clasping arm and the second clasping arm each offset in a distal direction from the resulting hinge pivot. The elastic cord retainer urges together the first clasping arm with the second clasping arm about the articulating joint. A method is also provided.

14 Claims, 22 Drawing Sheets

(56) References Cited

U.S. PATENT DOCUMENTS

| | | | |
|---|---|---|---|
| 7,614,909 B2* | 11/2009 | Lin | F16M 13/00 |
| | | | 439/528 |
| 8,006,846 B2 | 8/2011 | Robertson | |
| 8,087,416 B2 | 1/2012 | Defenbaugh et al. | |
| 8,287,020 B1 | 10/2012 | Guerin | |
| 8,348,296 B2* | 1/2013 | Taiga | B62J 11/00 |
| | | | 224/420 |
| 8,444,034 B2 | 5/2013 | Bennett | |
| 8,646,736 B2* | 2/2014 | Berry | A45F 5/021 |
| | | | 220/737 |
| 8,727,643 B2* | 5/2014 | Mcleod | F16M 11/041 |
| | | | 396/422 |
| 8,813,768 B2 | 8/2014 | Lee | |
| 8,857,775 B1 | 10/2014 | Clearman et al. | |
| 9,504,839 B2* | 11/2016 | Leven | A61N 1/0553 |
| 9,695,849 B2* | 7/2017 | Zhou | F16M 11/041 |
| 2009/0060473 A1* | 3/2009 | Kohte | F16M 11/041 |
| | | | 386/200 |
| 2011/0170246 A1* | 7/2011 | Chu | F16M 13/00 |
| | | | 361/679.01 |
| 2016/0069508 A1* | 3/2016 | Haymond | F16M 11/38 |
| | | | 29/857 |

* cited by examiner

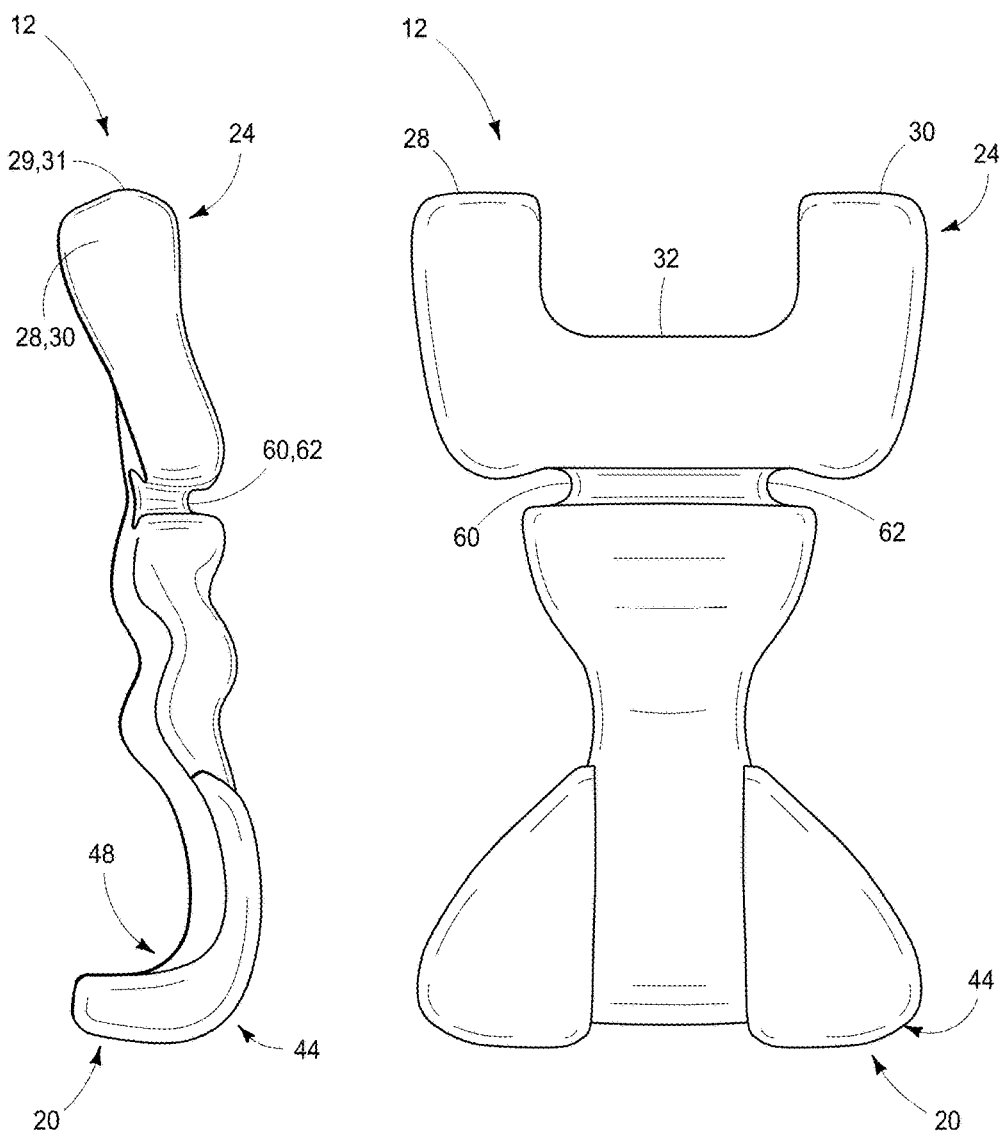

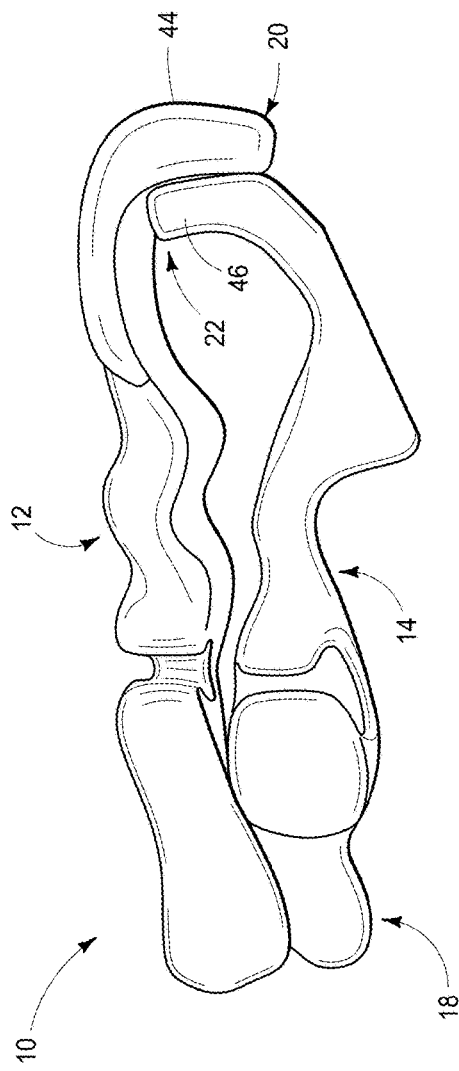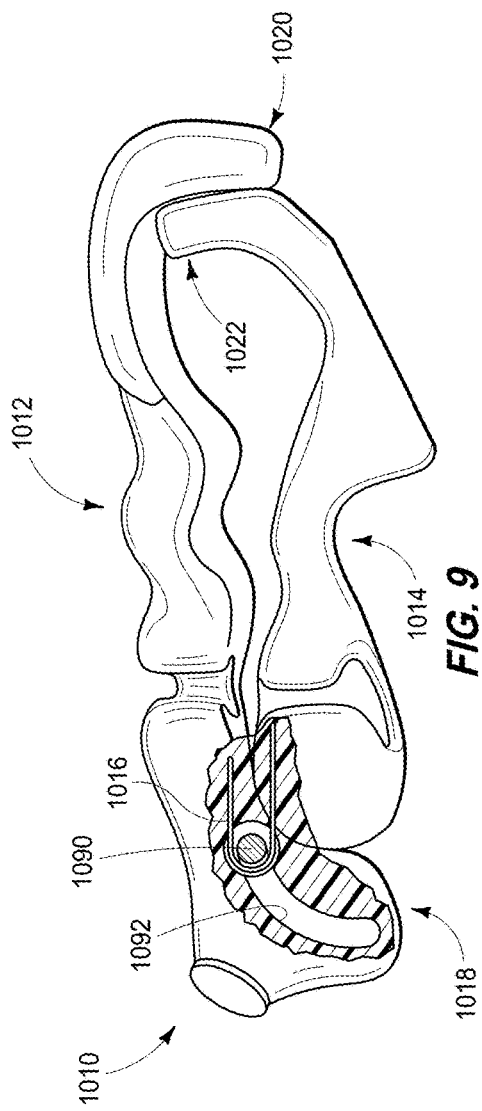

HOLDER FOR PORTABLE ELECTRONIC DEVICE AND METHOD

TECHNICAL FIELD

This disclosure pertains to accessories for portable electronic devices. More particularly, this disclosure relates to holders for portable electronic devices that support the devices and enable positioning and/or support of the devices on support structures and/or in engagement with users.

BACKGROUND

Techniques are known for supporting portable electronic devices. For the case of cellular telephones, it is known to have a clip-on holder that enables attachment and/or support of the phone in a vehicle, such as a car. There exists a need to further improve the manner in which such devices support any portable electronic device to facilitate use of such devices under a multitude of different orientations and/or operating environments. Other portable electronic devices, such as tablet computers, cameras, navigation devices, electronic book reading devices, handheld gaming devices, and computers can also benefit from such improvements.

SUMMARY

A holding apparatus for electronic communications devices and method are provided that includes a pair of opposed clasping arms that spring together via an articulating joint to capture a device there between.

According to one aspect, a holder for a portable electronic device is provided having a first clasping arm, a second clasping arm, and an elastic cord retainer. The first clasping arm has an articulating base member at a proximal end, an engagement portion at a distal end, and a receiving groove. The second clasping arm has a complementary articulating base member at a proximal end, an edge engagement portion at a distal end, and a receiving groove. The base member of the second clasping arm cooperates in assembly with the base member of the first clasping arm to define an articulating joint between the first clasping arm and the second clasping arm with the receiving groove of the first clasping arm and the second clasping arm each offset in a distal direction from the resulting hinge pivot. The elastic cord retainer is received in locked relation within the receiving groove of the first clasping arm and the receiving groove of the second clasping arm while in a stretched state so as to urge together the first clasping arm with the second clasping arm about the articulating joint.

According to another aspect, a holder is provided for a portable electronic device having a first arm, a second arm, and an articulation joint. The first arm has an articulating base member at a proximal end and an inwardly curved edge engagement portion at a distal end. The second arm has a complementary articulating base member at a proximal end and an inwardly curved edge engagement portion at a distal end. The base member of the second clasping arm cooperates in assembly with the base member of the first clasping arm to define an articulating joint between the first clasping arm and the second clasping arm. The articulation joint comprises the articulating base member of the first arm and the articulating base member of the second arm seated together in assembly.

According to yet another aspect, a method of retaining a portable electronic device is provided. The method includes: providing a holder and a portable electronic device, the holder having a first clasping arm, a second clasping arm, and an articulating joint provided at a proximal end of the first clasping arm and the second clasping arm for articulated positioning of the first clasping arm relative to the second clasping arm, and a spring biased to urge together the first clasping arm and the second clasping arm; articulating the first clasping arm away relative to the second clasping arm to urge apart distal ends of the first clasping arm and the second clasping arm to receive a portable electronic device there between; inserting a portable electronic device between the urged apart first clasping arm and the second clasping arm; and releasing the urged apart first clasping arm and the second clasping arm to urge together the first clasping arm and the second clasping arm to retain the portable electronic device there between

BRIEF DESCRIPTION OF THE DRAWINGS

FIG. 2 is a left side view of a top arm from the holder of FIG. 1.

FIG. 3 is a top plan view of the top arm of FIG. 2.

FIG. 8 is a left side view of the holder of FIG. 1 with the elastic spring omitted and showing nesting of the opposed edge engagement portions on each arm while in a closed configuration.

FIG. 9 is an alternative construction for a holder, similar to the holder of FIGS. 1-8, but with a sliding pin and torsional spring provided between the opposed arms.

DETAILED DESCRIPTION OF THE ILLUSTRATED EMBODIMENTS

This disclosure is submitted in furtherance of the constitutional purposes of the U.S. Patent Laws "to promote the progress of science and useful arts" (Article 1, Section 8).

As used herein, the term "ovoid" is understood to include both concave and convex surfaces.

Figure 1:
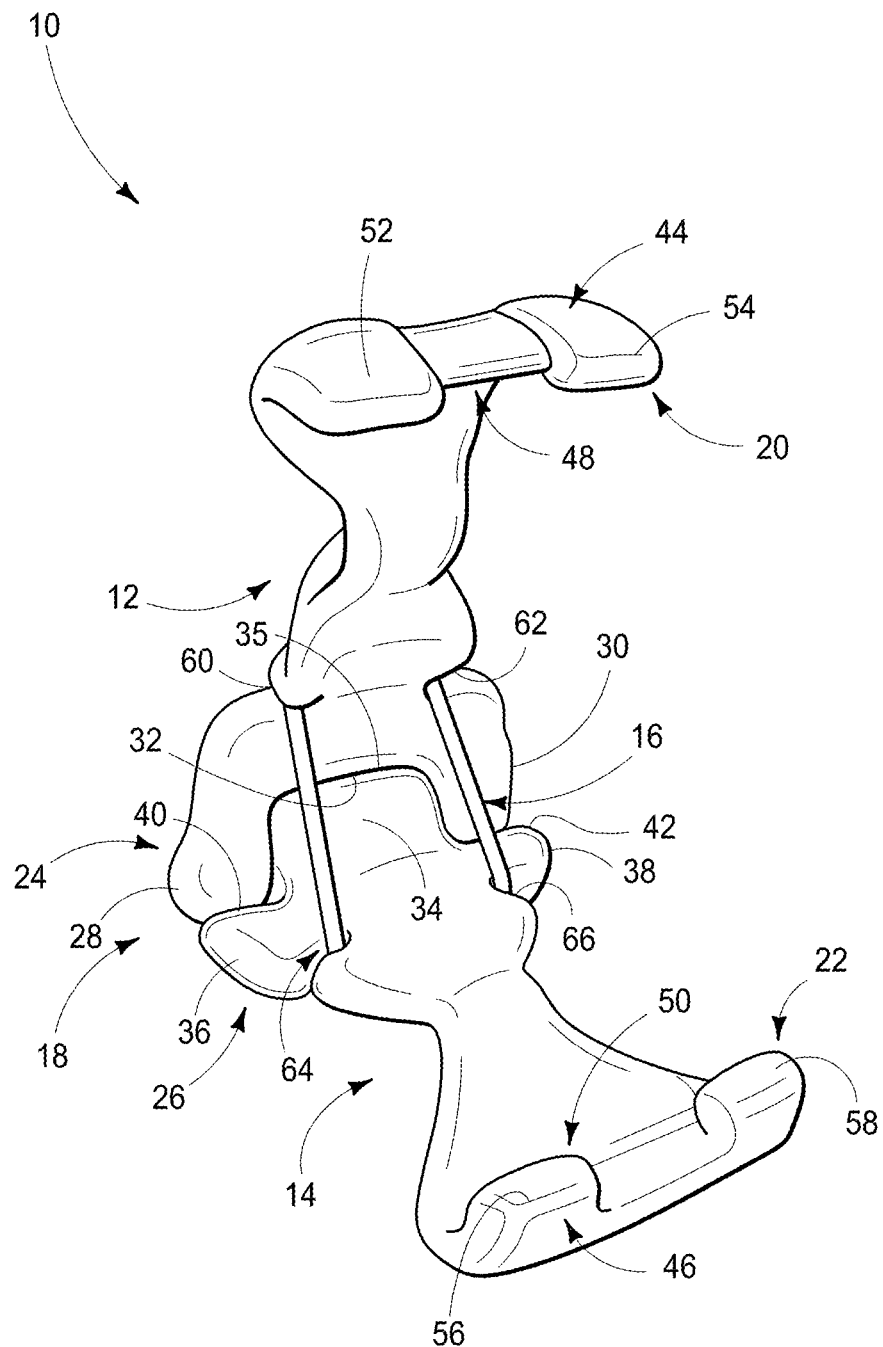
FIG. 1 is a perspective view of one version of a holder for portable electronic devices, according to one embodiment.

FIG. 1 illustrates a holder 10 for a portable electronic device, such as an electronic communications device, according to one implementation. A first, or upper clasping arm 12 and a second, or lower clasping arm 14 cooperate through an articulation joint 18 to grab and hold an electronic communications device, or any suitable portable electronic device via a spring, or elastic cord 16. An articulating base member 24 and 26 on a proximal end of each arm 12 and 14, respectively, communicate together to form articulation joint 18. Elastic cord 16 pivotally urges together edge engagement portions, or claws 20 and 22 each provided on a respective distal end of arms 12 and 14. Holder 10 can be used to retain any form of suitably sized portable electronic device including mobile phones, tablet computers, cameras, navigation devices, electronic book reading devices, handheld gaming devices, and computers, or also including cases for such devices.

Figure 6:
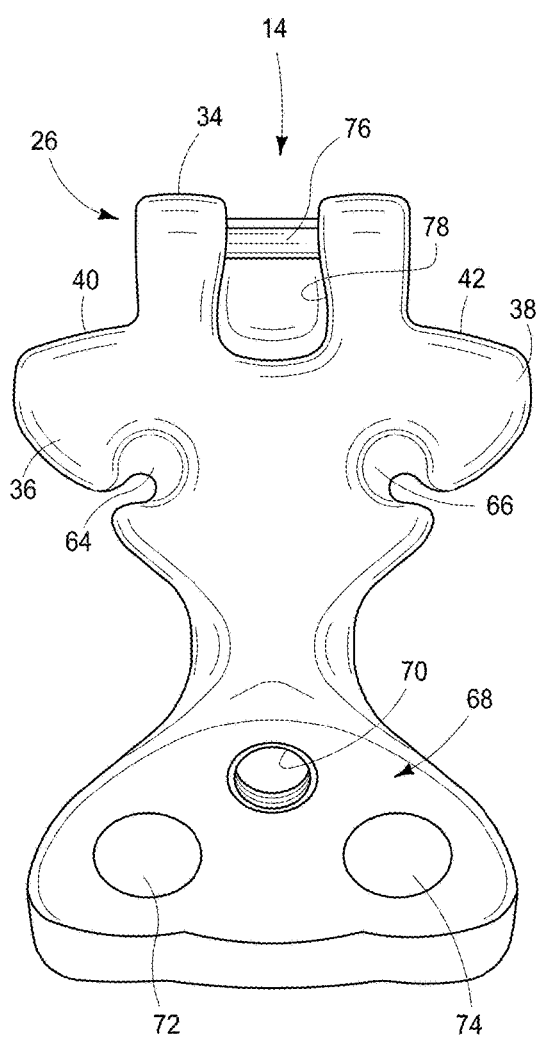
FIG. 6 is a bottom plan view of the bottom arm of FIG. 5.

Elastic cord 16 is formed from a single piece of elastic cord material, or bungee cord, extending from a lateral edge, or side groove 64 in arm 14 through opposed lateral edge, or side grooves 60 and 62 formed in arm 12 and back through lateral edge, or side groove 66 in arm 14. Grooves 64 and 66 enlarge at a bottom end, as shown in FIG. 6, and end knots, such as a surgeon's knot, are formed in each free end of elastic cord 16 which serve to seat and trap each end knot in the enlarged portion of each groove 64 and 66 such that elastic cord 16 is retained in a stretched state between arms 12 and 14, while in assembly. Optionally, cord 16 can be a continuously extending loop of elastic cord that completely encircles arms 12 and 14, in assembly, in a stretched state. Further optionally, a plastic or metal clip can be substituted for each end knot. Further optionally, each end knot (or clip) can be in-molded into arms 12 and 14 where grooves 64 and 66 are presently located.

Figure 4:
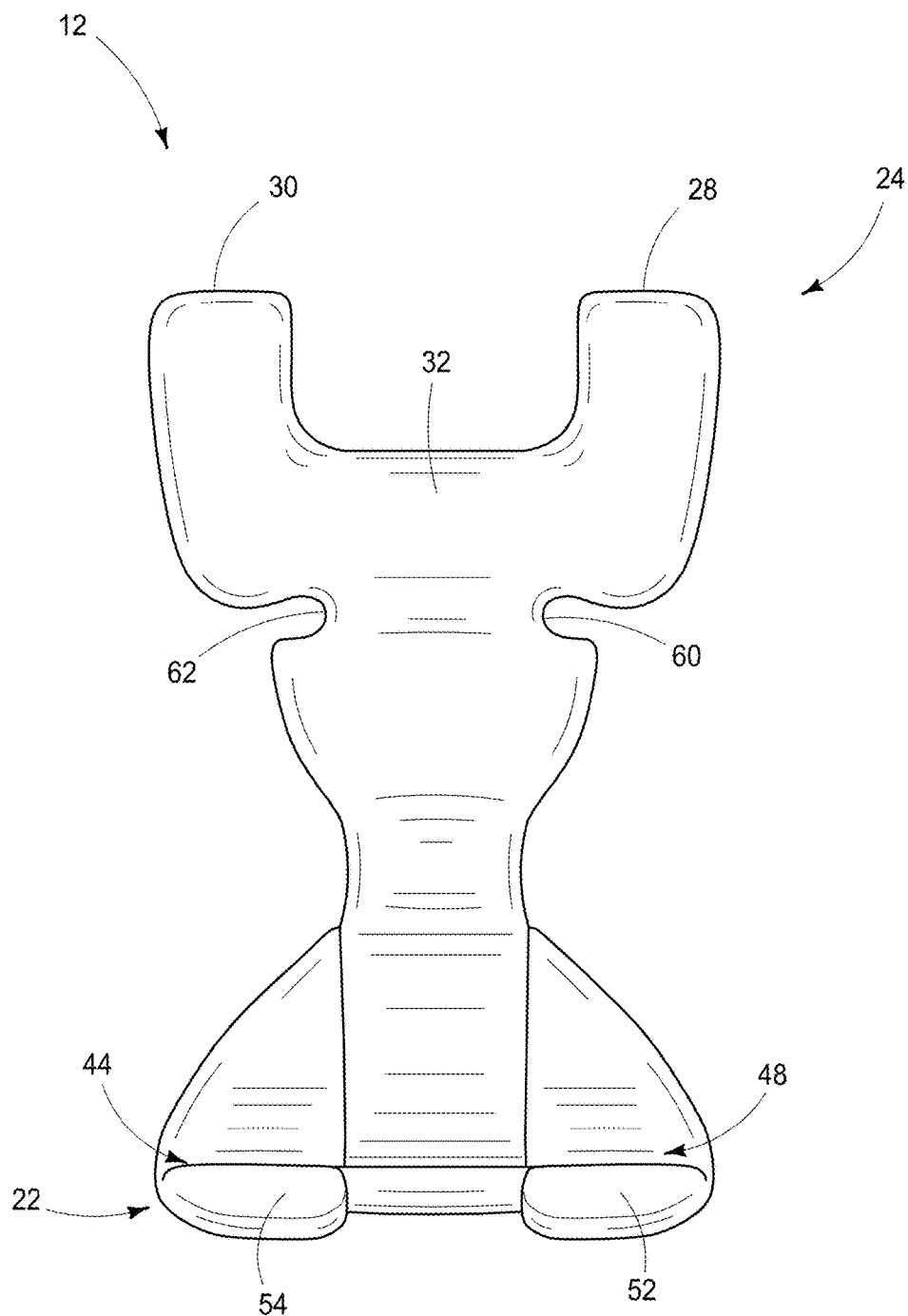
FIG. 4 is a plan view from below, or inside of the top arm of FIGS. 2-3.

Articulating base member 24 of arm 12, according to one construction, forms a Y-shaped yoke as shown in FIGS. 2-4. Base member 24 includes a pair of spaced apart branches, or arms 28 and 30, each respectively providing an ovoid articular surface 29 and 31 forming the Y-shaped yoke, or hinged joint member, and having an elliptical cavity 32 provided between the pair of arms 28 and 30.

Figure 5:
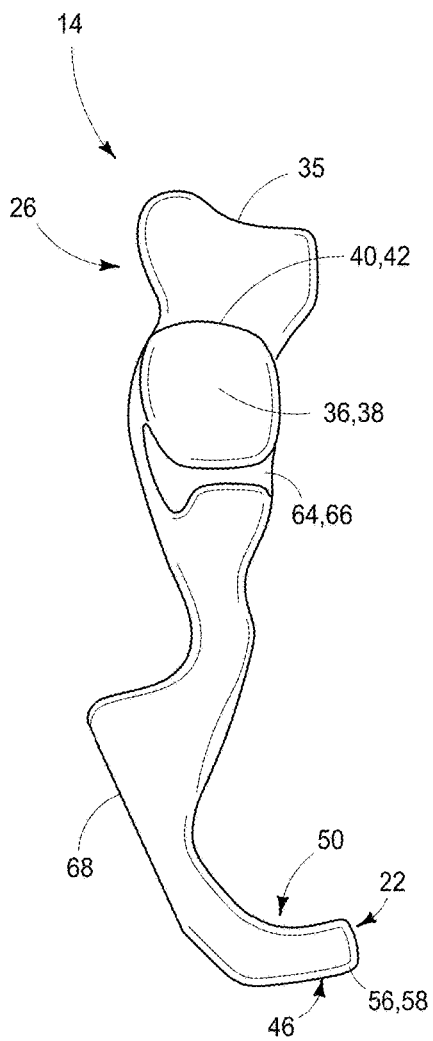
FIG. 5 is a left side view of a bottom arm from the holder of FIG. 1.
Figure 7:
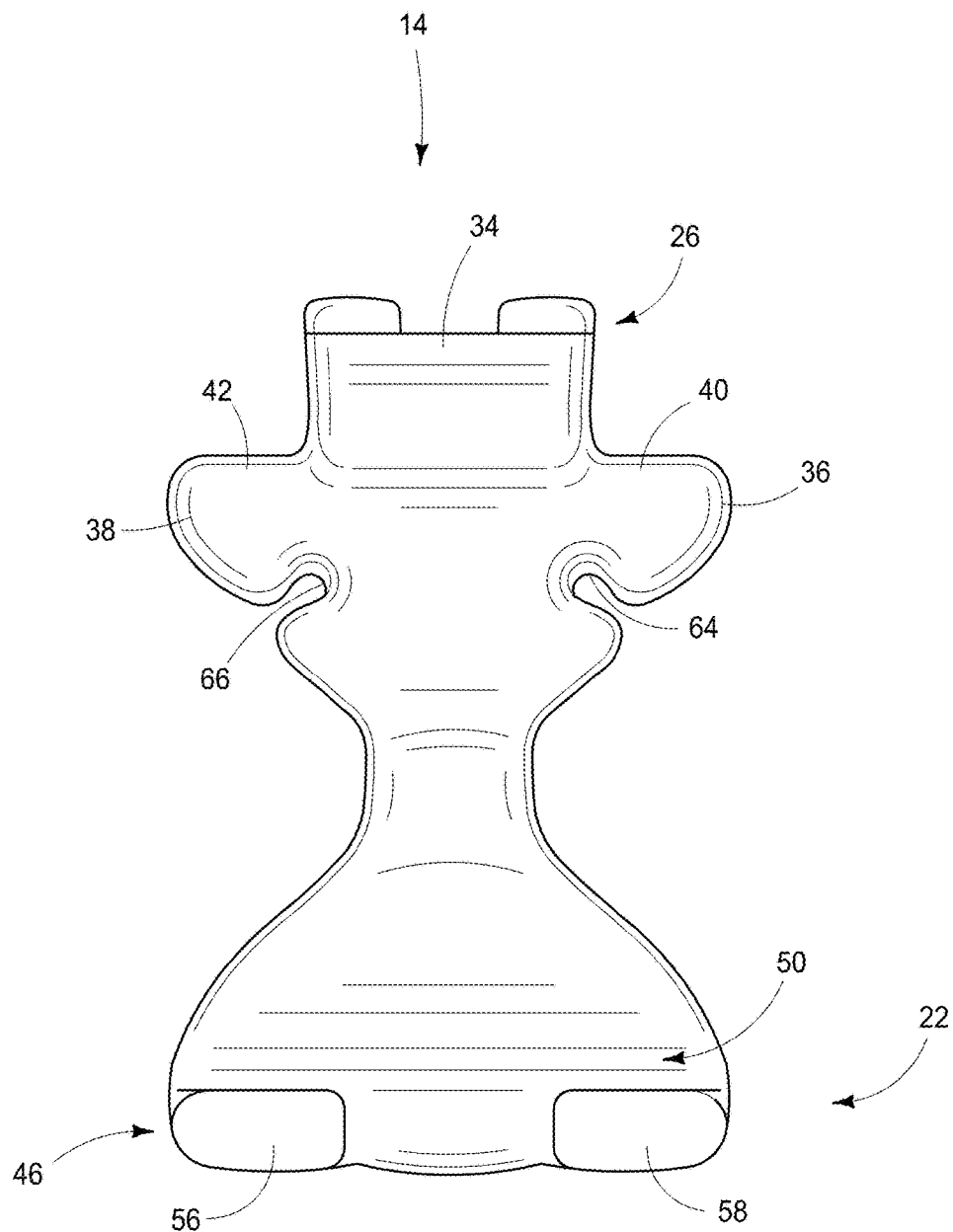
FIG. 7 is a plan view from above, or inside of the bottom arm of FIGS. 5-6.

Articulating base member 26 of arm 14, according to one construction forms a central protrusion 34 and a pair of laterally extending projections 36 and 38 provided distally of the protrusion 34 and extending outwardly in opposed relation to one another, as shown in FIGS. 5-7. Base member 26 includes an ovoid articular surface 35 provided along a central proximal end portion of the protrusion 34 on the second clasping arm 14 and sized to be received in articulating engagement in assembly within the elliptical cavity 32 provided between the pair of spaced apart ovoid articular surfaces 28 and 30 on the first clasping arm 12. In such one case, the ovoid articular surface 35 of base member 26 is configured to be received in articulating engagement in assembly between the pair of spaced arms 28 and 30 on the first clasping arm 12, as shown in FIG. 1. Furthermore, base member 26 includes central protrusion 34 and a pair of laterally extending projections 36 and 38 provided distally of the protrusion, extending outwardly in opposed relation to one another, and each having an ovoid articular surface 40 and 42 configured to mate with a respective one of the spaced apart ovoid articular surfaces 29 and 31 of the upper clasping arm 12.

In assembly, the articulating base member 24 of the first, or upper clasping arm 12 cooperates in assembly with the articulating base member 26 of the second clasping arm 14 to provide a compound joint imparting movement in two planes, as shown in FIG. 1. Such articulation is synonymous with motion imparted in a human knee joint. Base member 24 is complementary to base member 26. Base member 24 of clasping arm 12 cooperates in assembly with base member 26 of clasping arm 14 to define an articulation joint 18 there between. A pair of opposed receiving grooves 60, 62 and 64, 66 are provided on each arm 12 and 14 spaced distally from the articulating joint, or hinge 18. Elastic cord 16 is received through grooves, in assembly, in a stretched condition with an end knot provided on each end of cord 16 that is seated and locked within grooves 64 and 66, as shown in FIGS. 5 and 6. Accordingly, in this stretched state, cord 16 serves as an elastic cord retainer that is received within the receiving grooves 60, 62 of the first clasping arm 12 and the receiving grooves 64, 66 of the second clasping arm 14 while in a stretched state so as to urge together the first clasping arm 12 with the second clasping arm 14 about the articulation joint 18.

In operation, articulation joint 18 comprises a compound joint that is similar in structure and function to a human tibiofemoral joint that has rolling contact point(s), providing a rolling and sliding joint. Bungee cord 16 acts similar to ligaments in the human knee, generating compression forces during articulation of joint 18. As the resulting joint flexes, an instant center of rotation between arms 12 and 14 moves posteriorly which provides for increased flexion by avoiding impingement of the joint. A resulting 3 bar hinge mechanism with one elastic member is thereby provided. Such rolling and sliding joint motion serves to facilitate, at least in part, jaw 44 overlying jaw 46 when closed together.

Edge engagement portion 20 and 22 on respective arms 12 and 14 each terminate at a distal end with a respective jaw, or ledge 44 and 46, as shown in FIG. 1. Each jaw 44 and 46 forms an in-turned edge including a pair of teeth or projections 52, 54 and 56, 58. A crotch, or groove 48 and 50 is formed behind each jaw 44 and 46 configured to receive an edge on a portable electronic device when retained between jaws 44 and 46. In assembly, jaw 44 overlies jaw 46 when clasping arms 12 and 14 are closed together (cord 16 is omitted for clarity), as shown in FIG. 8. Jaw 44 forms an inwardly curved edge engagement portion of the first clasping arm 12 that overlies jaw 46, also an inwardly curved edge engagement portion of the second clasping arm 14, when the first clasping arm 12 is nested in engagement with the second clasping arm 14.

A platform base 68 is provided on a distal end of clasping arm 14, spaced from articulating base member 26, as shown in FIGS. 5 and 6. Base 68 provides a support surface to the holder for positioning the holder (and a retained portable electronic device) in a desired position on a support surface. As shown in FIG. 6, base 68 provides a plurality of fixtures for affixing a holder to a support surface including a pair of spaced-apart magnets 72, 74 and a threaded camera mount insert 70, such as a ¼" 20 thread female mount.

Holder 10 of FIGS. 1-8 is provided with a retention pin 76 that is molded into base member 26 across a cavity 78. Pin 76 is provided for securing a lanyard or keychain onto pin 76. In addition, arms 12 and 14 of holder 10 can be made of any suitable structural material, in addition to molded plastic, such as metal, wood, bone, stone, composite, or any other material capable of functioning as a structural material and potentially having desirable aesthetic characteristics FIG. 9 is an alternative construction for a holder 1010, similar to holder 10 of FIGS. 1-8, but with a sliding pin 1090 and torsional spring 1016 provided between the opposed clasping arms 1012 and 1014. Torsional spring 1016 is carried by pin 1090 for arcuate movement along a curved slot 1092, thereby providing a compound articulating joint 1018 that imparts movement in two planes. Joint 1018 is shown with first clasping arm 1012 nested in closed relation with second clasping arm 1014 such that claw 1020 overlies claw 1022 and pin 1090 rides to an uppermost position along slot 1092 as a result of spring 1016 seeking a closed position.

Figure 10:
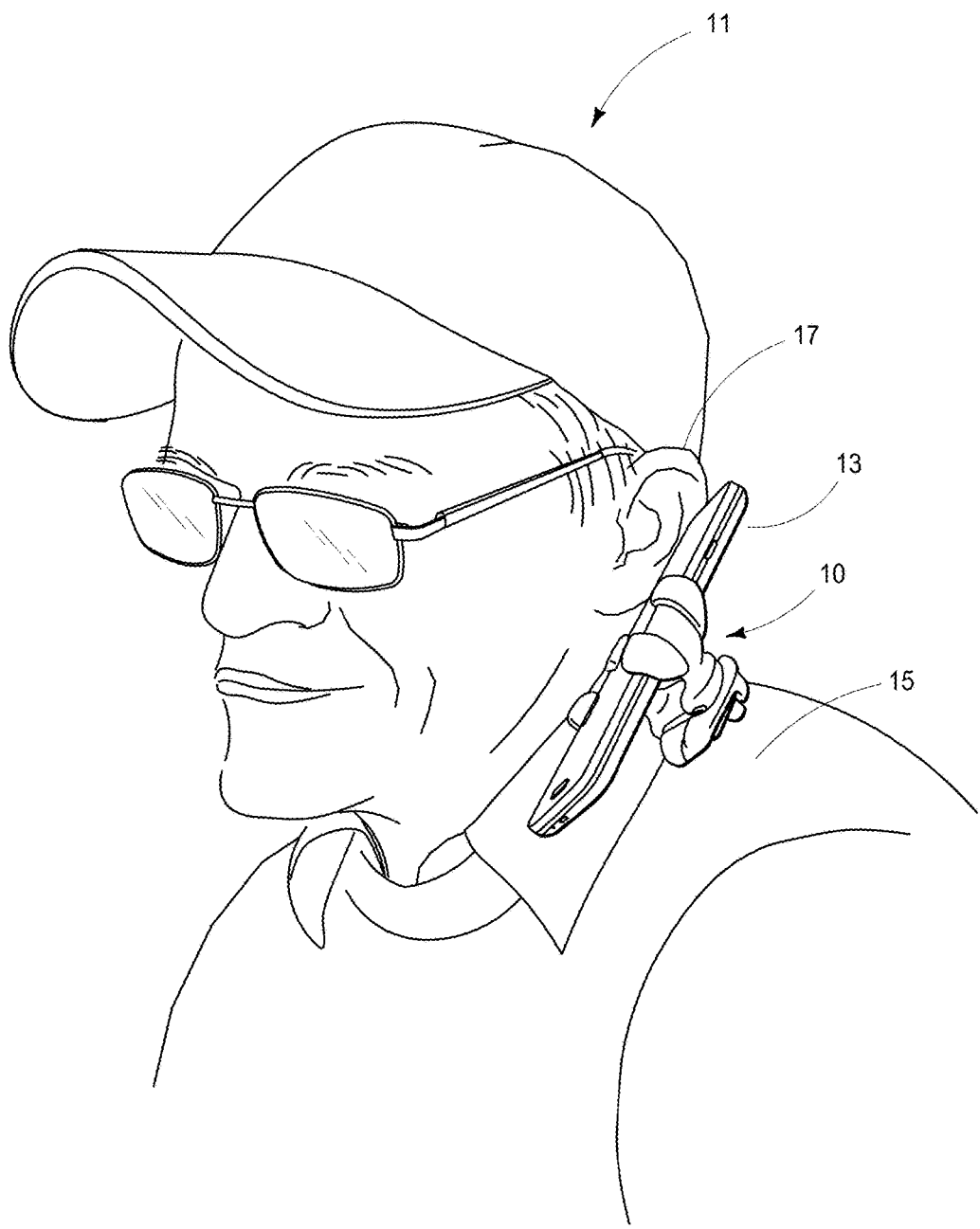
FIG. 10 is a perspective view of an individual using the holder of FIGS. 1-8 retaining a mobile phone with the phone and device captured between the individual's neck and shoulder.

FIG. 10 depicts an individual user 11 nesting a portable electronic device, or mobile phone 13 proximate their ear 17 while retained by holder 10 atop a shoulder 15. A slight tilt of the user's head and neck traps the retained phone and holder between the user's ear/face and shoulder.

Figure 11:
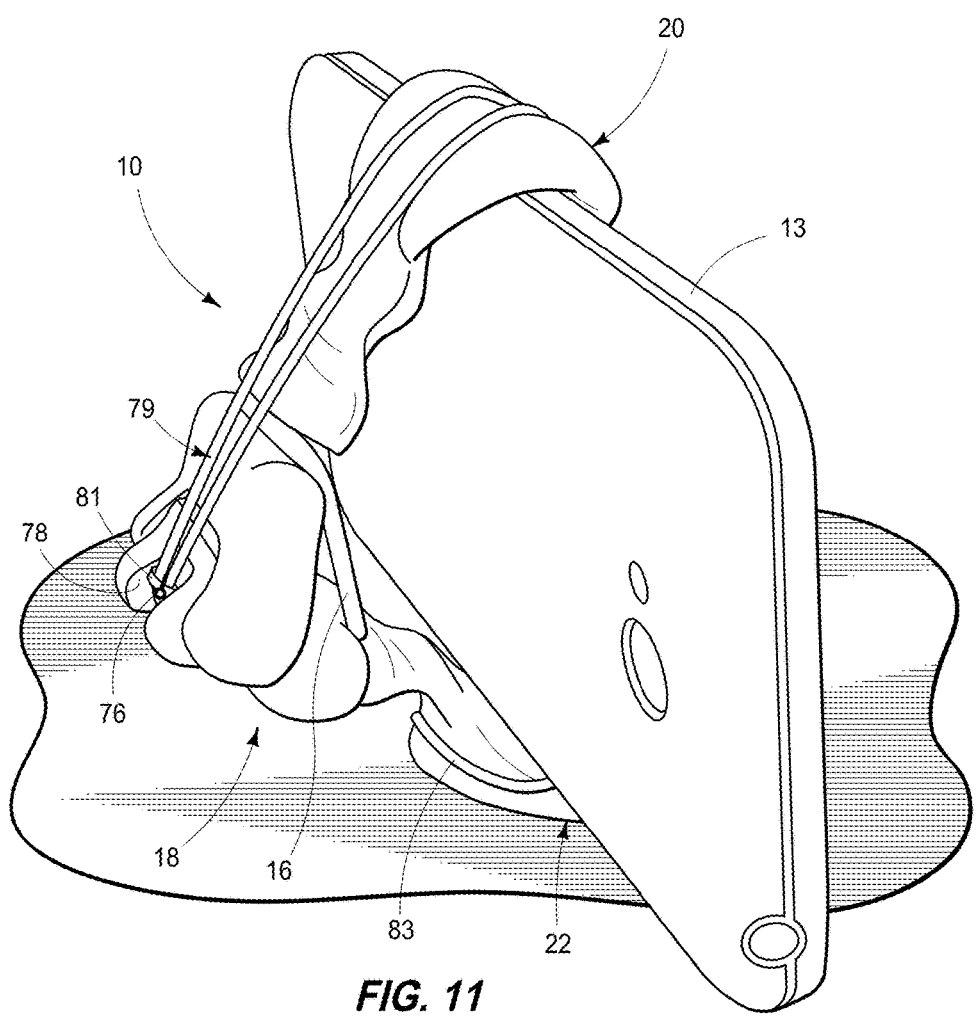
FIG. 11 is a perspective view from behind of the holder of FIGS. 1-8 and 10 depicting the holder and mobile phone supported on a horizontal surface by a foot.

FIG. 11 is a perspective view from a backside of the holder of FIGS. 1-8 and 10 depicting the holder 10 and mobile phone 13 supported on a horizontal surface by foot 68 on lower claw 22. A special purpose lanyard is optionally provided in the form of an elastic bungee cord, or retention device, 79 that serves to lock and retain a portable electronic device, or phone, within holder 10. Cord 79 comprises a continuous loop of elastic bungee cord that is retained at a first end with a clove hitch 81 onto pin 76 and an open-loop end 83 at an opposite end. Pin 76 is either in-molded or press-fit into opposed bores in sidewalls of cavity 78 (through a through-hole opening). Loop end 83 is stretched over an enlarged head portion of claw 22 formed by platform 68 while medial portions of cord 79 each pass through a groove formed on a backside of each claw 20 and 22 between pairs of projections 52, 54 and 56, 58 While cord, or spring 16 serves to urge claws 20 and 22 together, optional retention device 79 serves to further lock a mobile device, or phone 13 between claws 20 and 22 after a device has been retained by holder 10. Such secondary closure or lock is optionally used when holder 10 is utilized under harsh operating conditions, such as when phone 13 is being used to record video with an integral video camera when mounted to a "selfie-stick" or other camera mount system. With social media and video sharing websites, holder 10 can be used in conjunction with any of a number of commercially available camera mount systems to take video while skiing, snowboarding, riding a mountain bike, or other similar activity likely to cause jarring or vibration. One suitable set of camera mounts are sold under the brand name RAM® Mounts, by National Products Incorporated, 8410 Dallas Avenue South, Seattle, Wash. 98108 USA.

Figure 12:
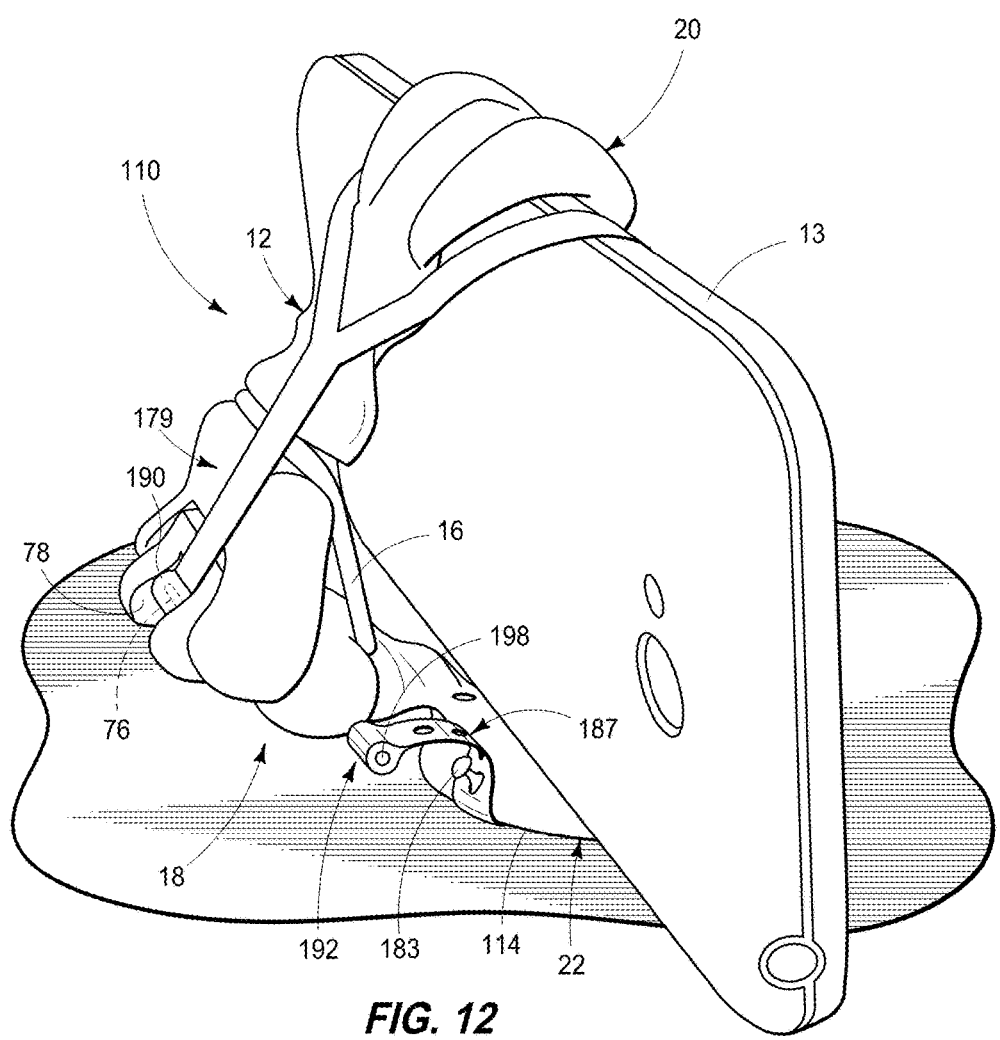

FIG. 12 is a perspective view from a backside of a modified version of holder of FIGS. 1-8 and 10 depicting holder 110 and mobile phone 13 supported on a horizontal surface by a foot on lower claw 22. A special purpose lanyard is provided in the form of an elastic rubber strap assembly, or retention device, 179 that serves to lock and retain a portable electronic device, or phone, within holder 10. Retention device, or strap 179 comprises a synthetic rubber strap having an enlarged boss end portion 190 that is affixed via a cylindrical press-fit pin 76 into opposed sidewalls forming cavity 78. An opposite end of strap 179 is removably mated and demated from a enlarged-head fastener 183 affixed to a back side of claw 22 on arm 114 using one of a plurality of spaced-apart holes 187 adjacent enlarged boss end portion 192. Optionally, strap 179 can be formed from silicon, natural rubber, elastomer, or any other suitable material having elastic properties enabling stretching of strap 179 under axial load sufficient to urge a selected hole 187 over an enlarged head on fastener 183.

Figure 14:
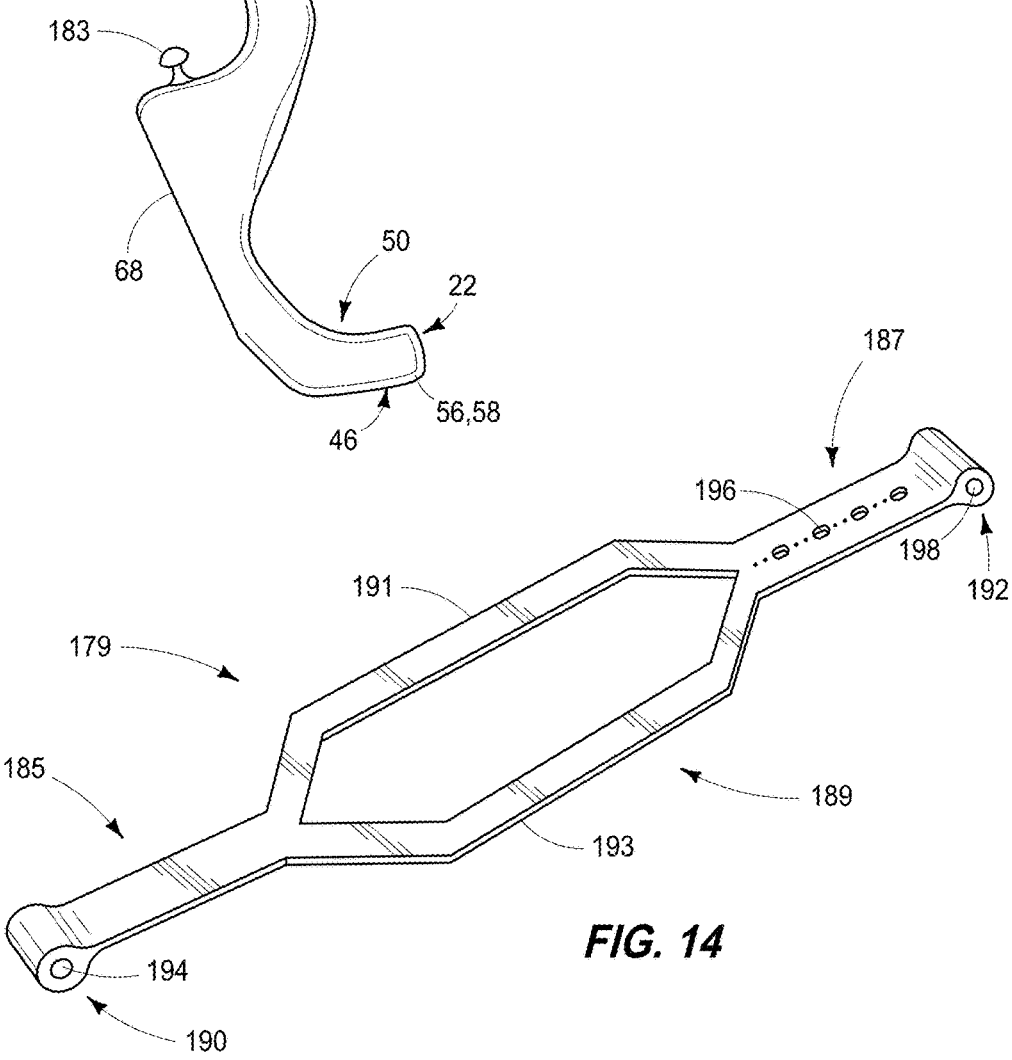

As shown in FIG. 14, strap 179 provides a retention device having an enlarged boss end portion 190, an elongate segment 185, a pair of spaced apart segment that form a window frame 189 there between having six sides, and an elongate segment 187 that terminates distally in another enlarged boss end portion 192. In assembly, pin 76 (see FIG. 12) is received through bore 194. A plurality of equally spaced apart holes 196 extend lengthwise along segment 187 provided to adjust length of strap 179 between pin 76 and fastener 183 when a phone has been captured between claws 20 and 22. Hinge 18 and bungee core 16 serve to trap phone 13 between claws 20 and 22, as shown in FIG. 12. However, strap 179 serves to further lock and retain phone 13 within holder 110 when being used in situations where jarring and shaking might otherwise dislodge phone 13 from holder 110. A hole 198 in end portion 190 can serve to receive a key chain or a lobster claw for a key chain. Although window frame 189 is shown as a trapezoidal shape, it is understood that such window frame can have a circular, elliptical, square, or rectangular shape. Window frame 189 enables touch screen access and viewing of a user interface on the mobile phone 13 while in use.

Figure 13:
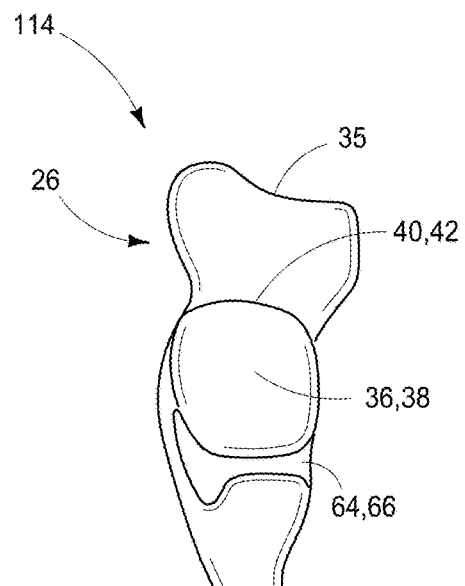

As shown in FIG. 13, lower clasping arm 114 is essentially the same as arm 14 (of FIG. 1), except for the addition of enlarged head fastener 183 which is affixed to arm 114 with a threaded portion that is screwed into arm 114, leaving the exposed enlarged head portion. Remaining identified numerals correspond with features identically numbered and identified previously with respect to FIG. 5.

Figure 15:
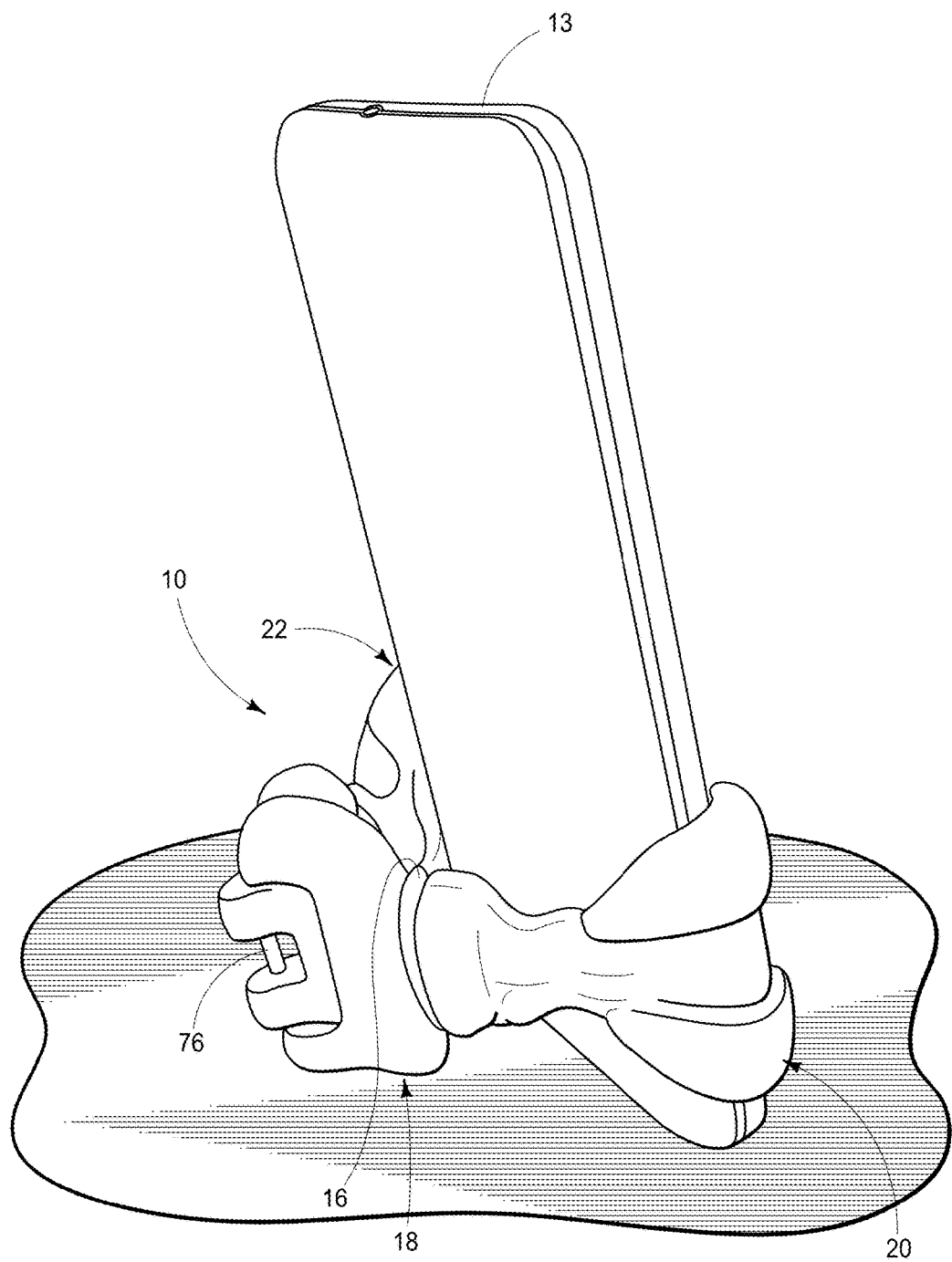
FIG. 15 is a perspective view from behind of the holder of FIG. 11 depicting the holder and mobile phone supported on a horizontal surface in a second orientation engaging a bottom portion of the phone and an edge of an articulation joint.

FIG. 15 is a perspective view from behind of the holder 10 of FIG. 11 depicting the holder 10 and mobile phone 13 supported on a horizontal surface in a second orientation engaging a bottom portion of the phone 13 and a lower edge of articulation joint 18. In such case, holder 10 is affixed along a bottom edge of mobile phone 13, between claws 20 and 22 via spring tension of elastic bungee band 16 acting across articulation joint 18. Pin 76, as previously discussed, can receive a keychain, a lanyard, or a retention device, such as strap 179 (of FIG. 12).

Figure 16:
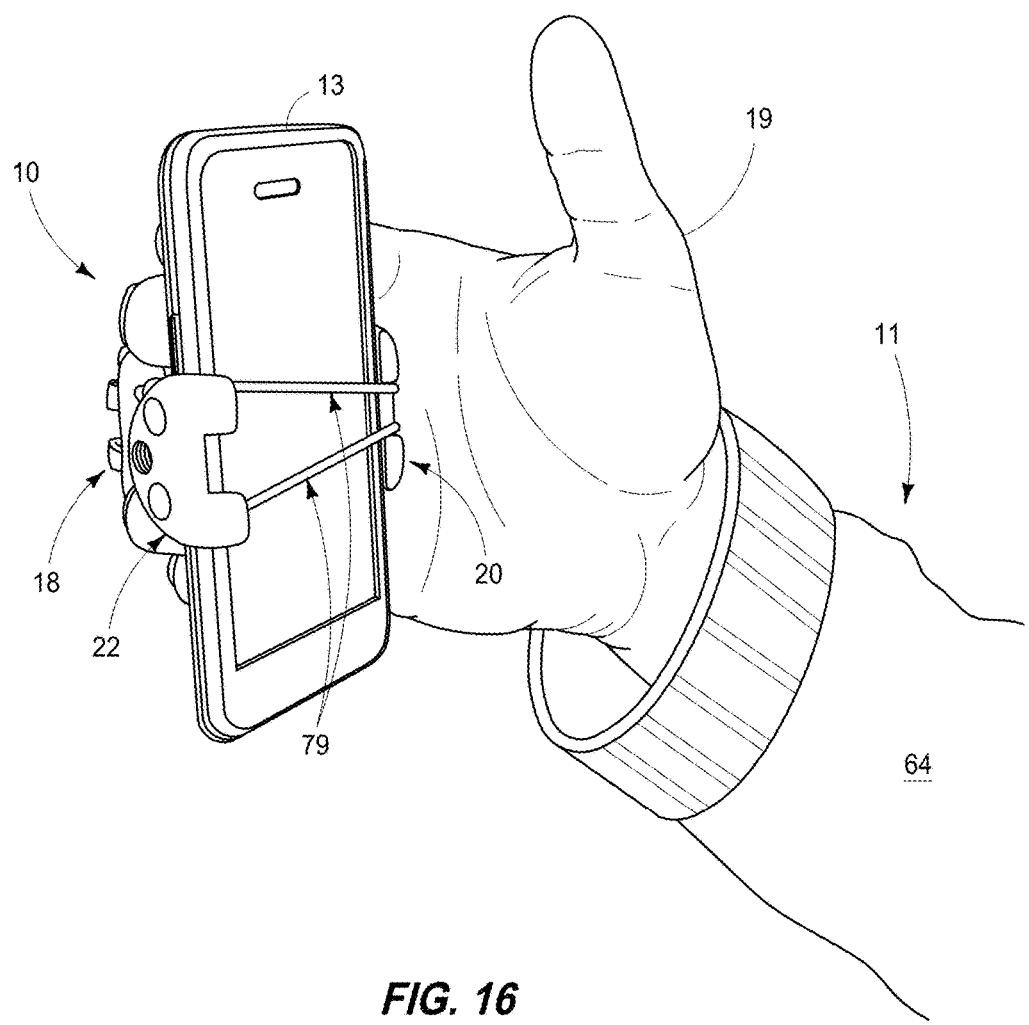
FIG. 16 is a perspective view from a front side of the holder of FIGS. 1-8 and 10-12 depicting a user grasping the holder while supporting a mobile phone.

FIG. 16 is a perspective view from a front side of the holder 10 of FIGS. 1-8 and 10-12 depicting a user 11 grasping the holder 10 with a hand 19 via an arm 64 while supporting a mobile phone 13. As shown, mobile phone 13 is being used (via an app) to capture a video recording while user 11 grasps holder 10 and phone 13. An enlarged portion of articulation joint 18 forms an ergonomic projection across which a user splits their fingers while grasping holder 10 and phone 13, providing for a more firm and positive grip. In addition to being held by the spring action imparted between claws 20 and 22, elastic retention device 79 further secures and locks phone 13 within holder 10 which proves important when using phone 13 in rough and rugged environments, such as riding a mountain bike or skiing.

Figure 17:
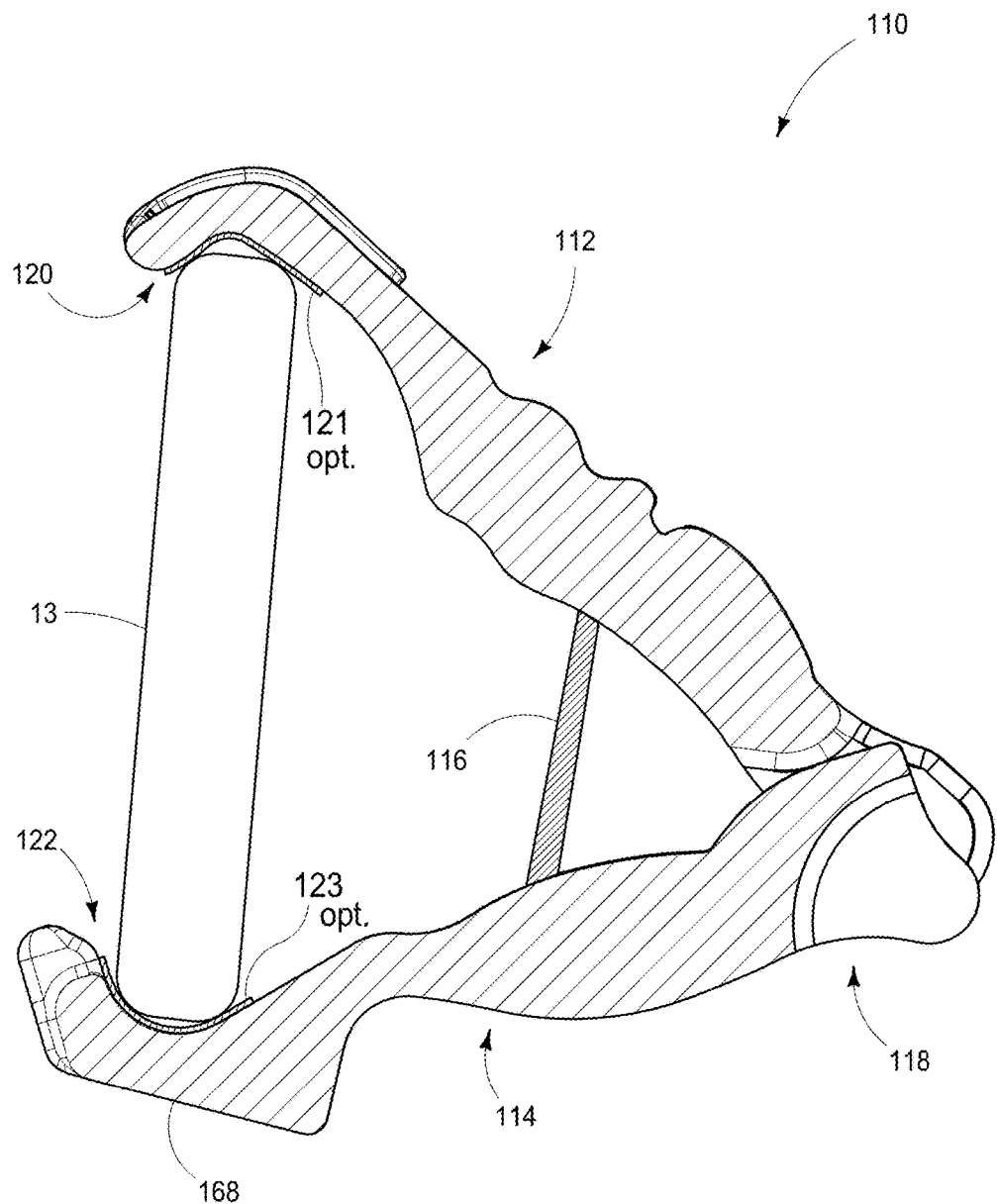
FIG. 17 is a vertical sectional view of the holder of FIGS. 18-21 retaining a mobile phone and taken along line 17-17 of FIG. 20.
Figure 18:
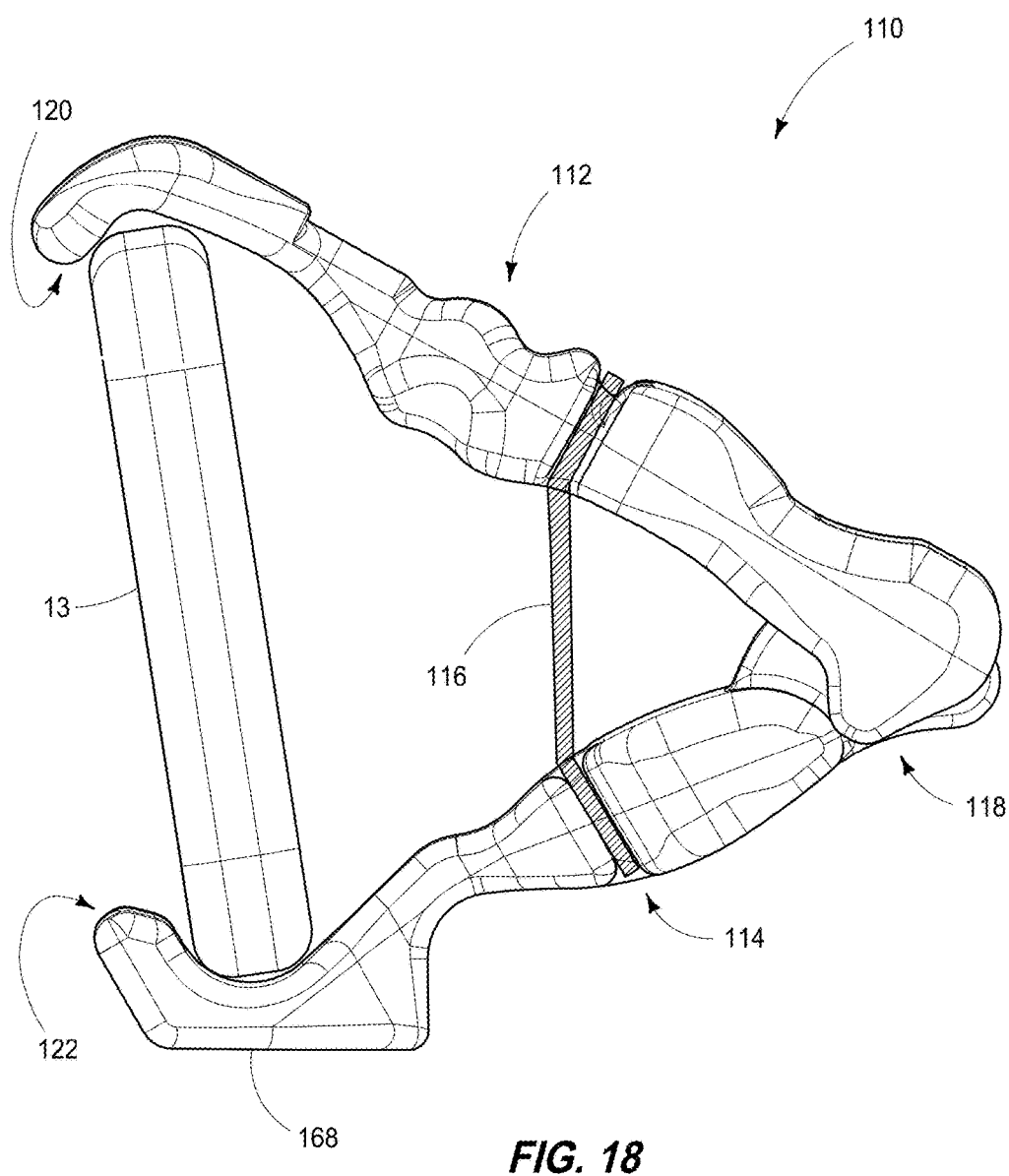
FIG. 18 is a side view of the holder and phone of FIG. 17 showing the holder supported on a horizontal surface by a heel portion.
Figure 19:
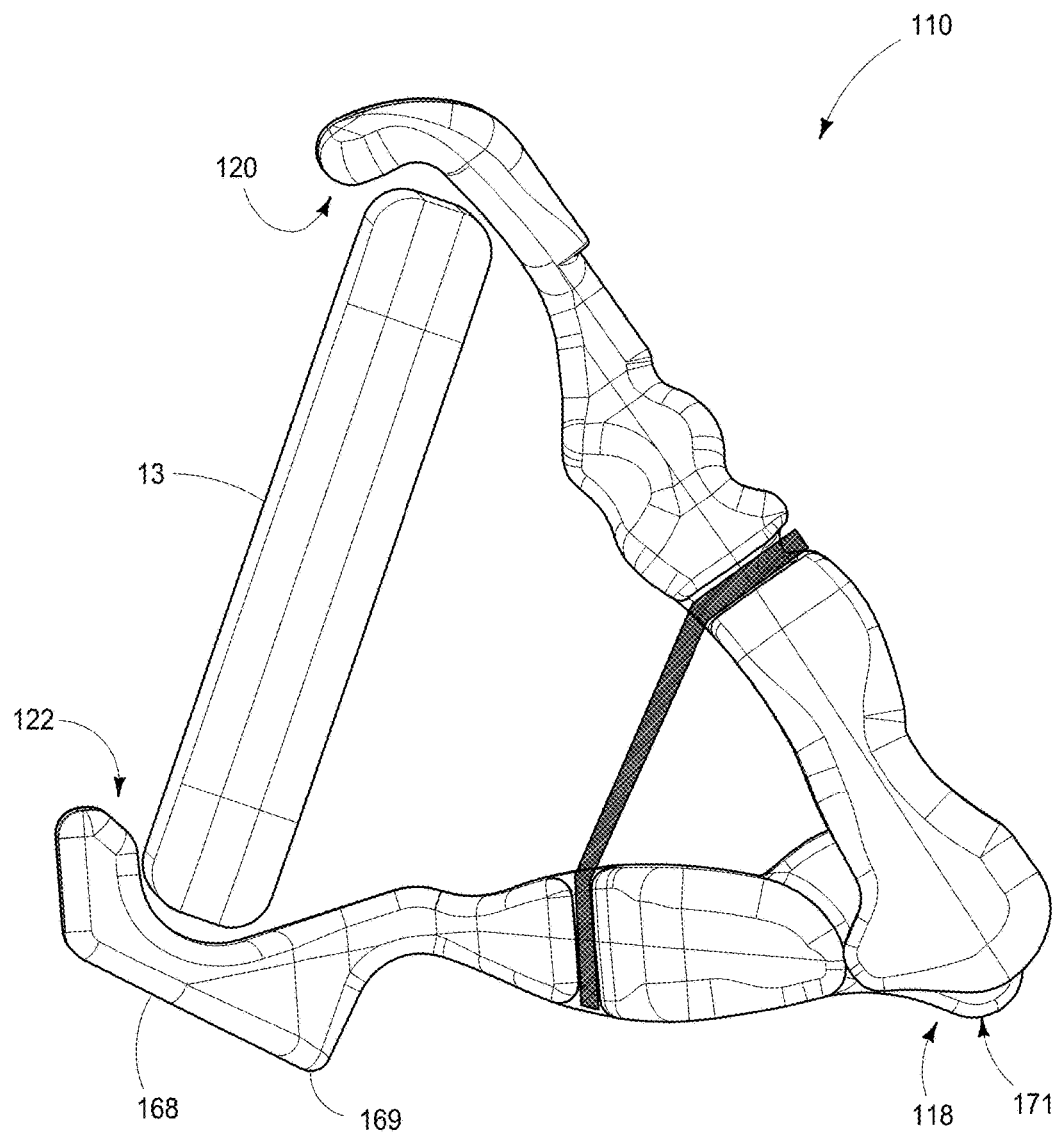
FIG. 19 is a side view of the holder and phone of FIGS. 17-18 showing the holder supported on a horizontal surface by a heel portion and an articulation joint.
Figure 20:
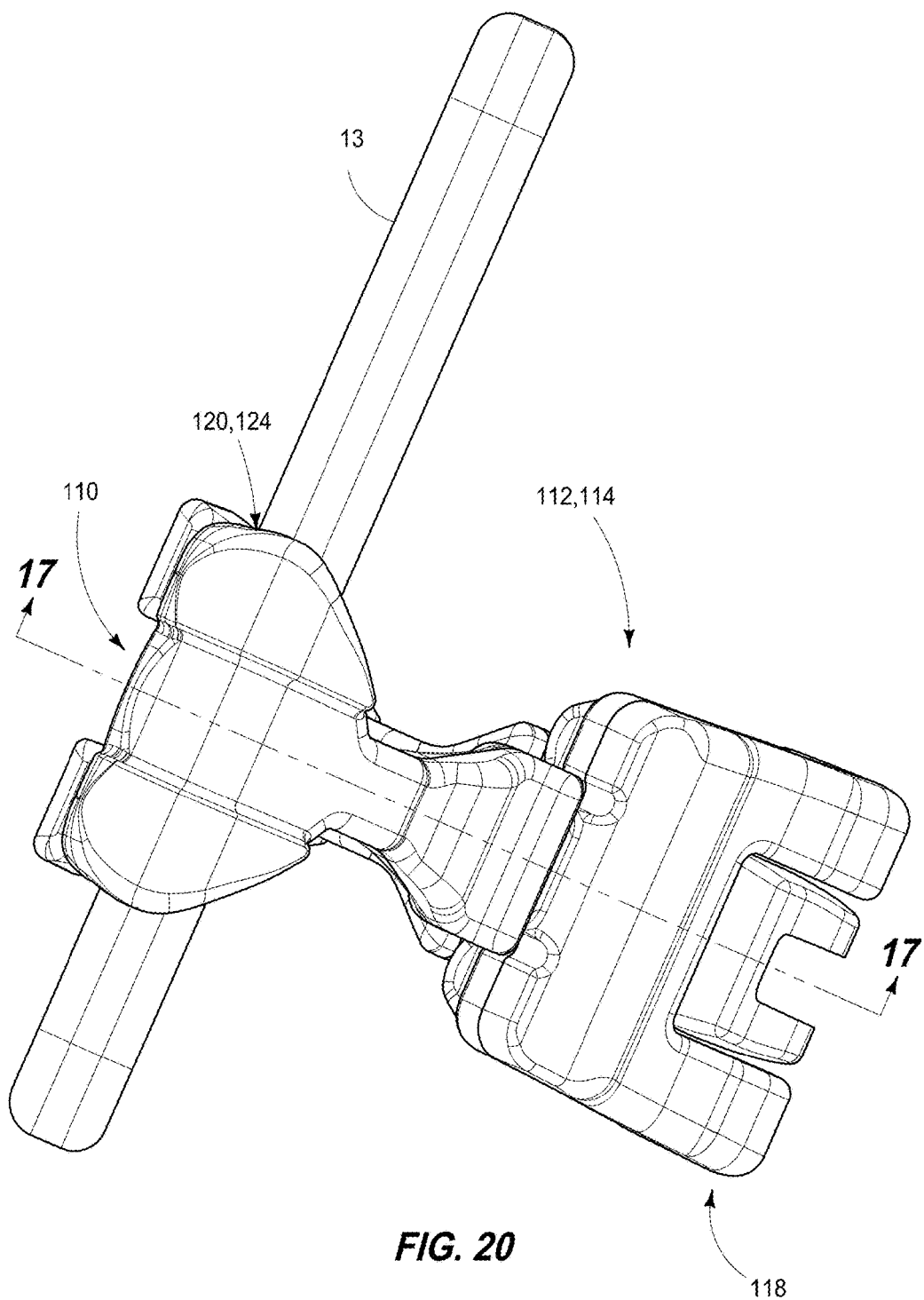
FIG. 20 is plan view from above of the holder and phone of FIG. 17-19.

FIGS. 17-22 illustrate a computer aided design (CAE) generated variation of holder 110 that operates essentially the same as holder 10 (of FIG. 1). FIG. 17 is a centerline sectional view taken along line 17-17 of FIG. 20. Holder 110 has been optimized geometrically for manufacturability. As shown in FIGS. 17, 18 and 20, clasping arms 112 and 114 are urged together about articulation joint 118 as spring force is generated by a stretched condition of an elastic cord 116 that spans arms 112 and 114 to grasp a portable electronic device in the form of a mobile phone 13.

In operation, opposing claws 120 and 122 are forcible urged together to trap phone 13, while a platform base 168 (similar to base 58 of FIG. 5) is also provided as shown in FIG. 17. A heel 171 is provided on joint 118 of holder 110 that cooperates with a heel 169 on base 68 to form a pair of support surfaces configured to support holder 110 on a horizontal surface, as shown in FIG. 19, while claws 120 and 122 securely retain phone 13.

Optionally, or additionally, thin rubber pads 121 and 123 are insert molded into inner faces of claws 120 and 122 as shown in FIG. 17. Optionally, such pads 121 and 123 can be in-molded into such faces during manufacturing. Furthermore, such rubber pads can be formed of any other suitable material having a higher coefficient of friction than the materials used to form arms 112 and 114, such as any natural or synthetic rubber compound, silicon, cork or other material that provides an increased gripping surface. Finally, such pads 121 and 123 can be optionally provided on holder 10 (of FIG. 1).

Figure 21:
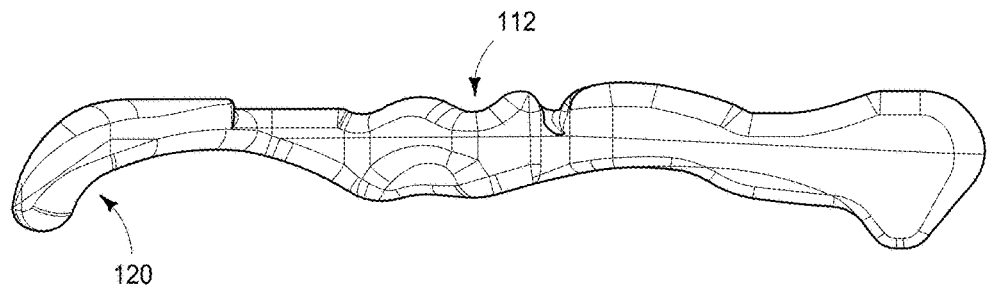
FIG. 21 is a side component view of an upper clasping arm for the holder of FIGS. 17-20.
Figure 22:
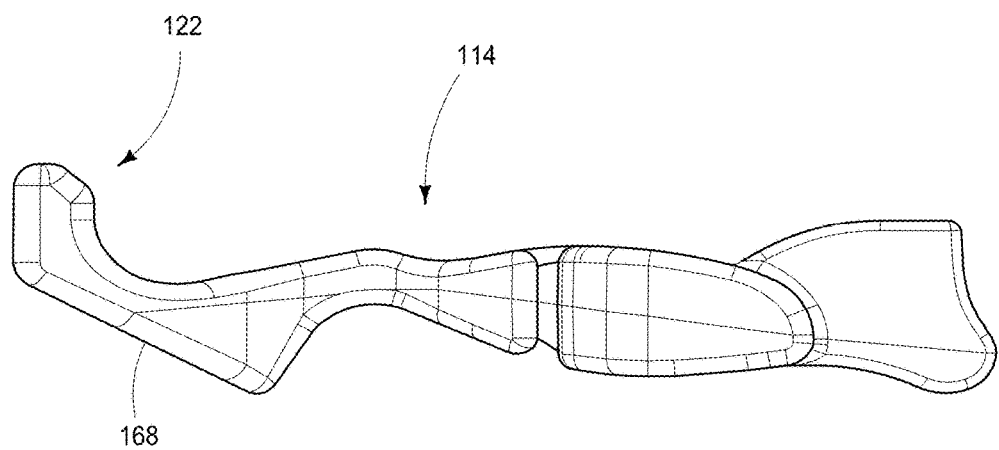
FIG. 22 is a side component view of a lower clasping arm for the holder of FIGS. 17-20.

FIG. 21 illustrates in side view a desired surface geometry for arm 112 and claw 120, while FIG. 22 illustrates in side view a similar desired surface geometry for arm 114, claw 122 and platform base 168. As shown in FIGS. 17-22, surface geometry lines on arms 112 and 114 represent geometric computer aided engineering surface geometry construction lines used to define surface contours of the resulting parts.

Figure 23:
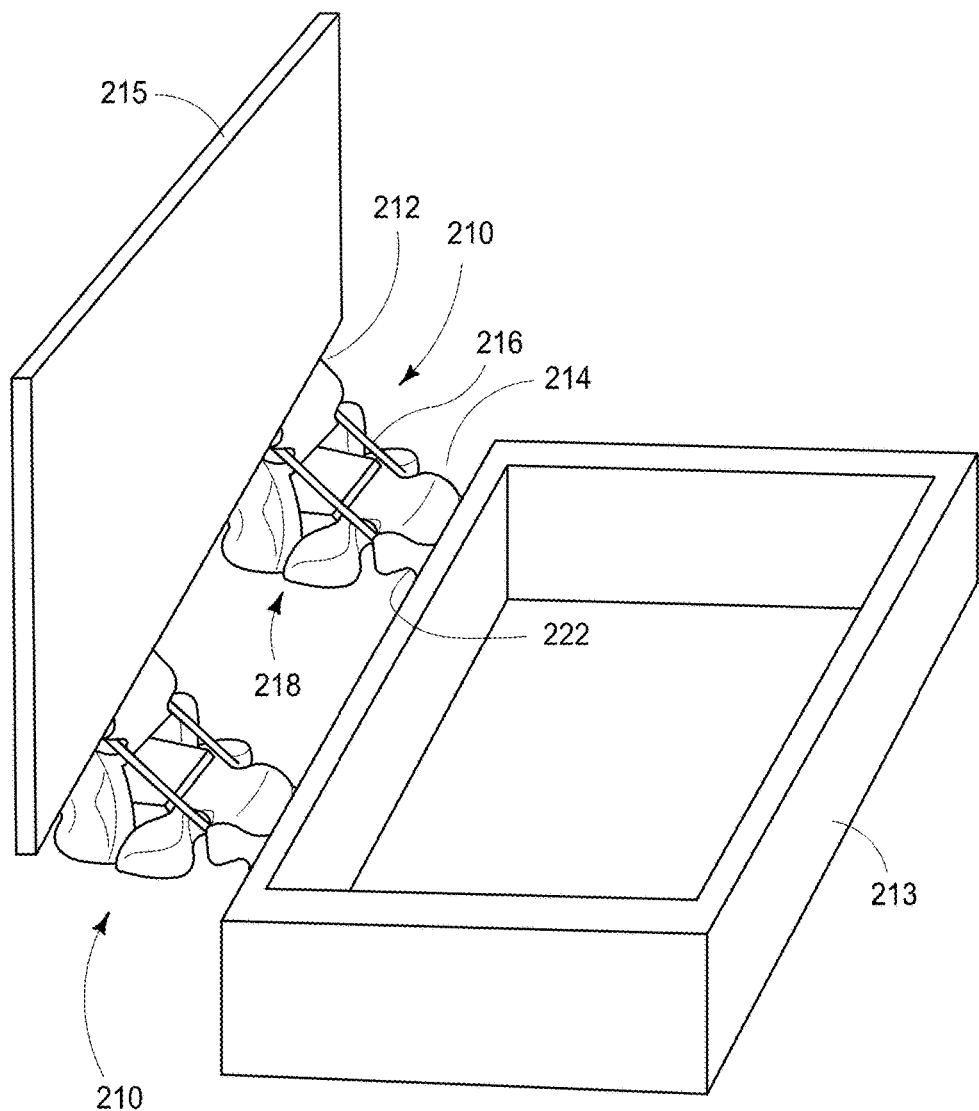
FIG. 23 is a perspective view of an alternative construction hinge assembly using the articulation joint depicted in FIGS. 1-22.
Figure 24:
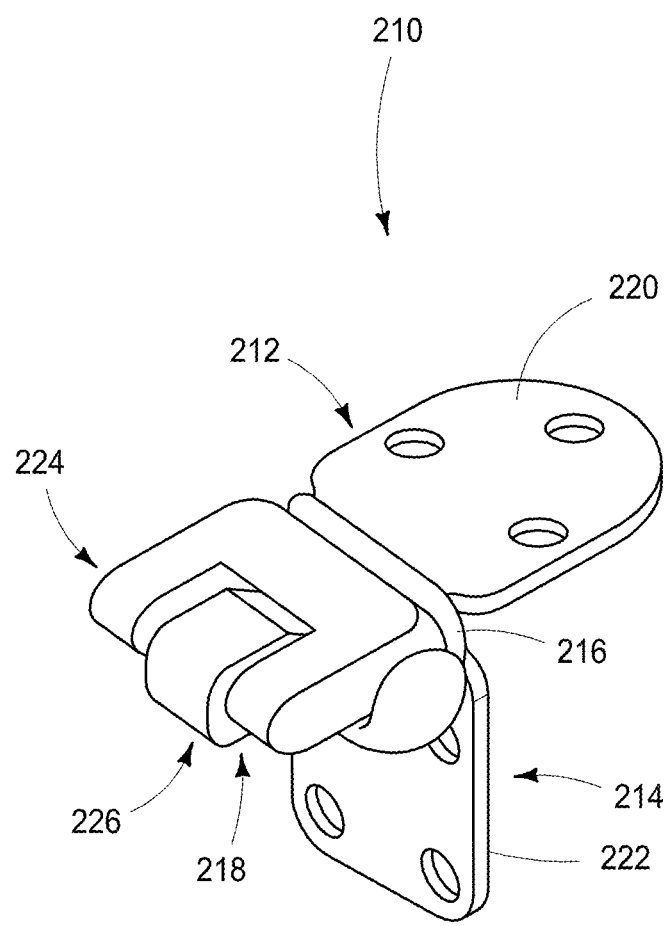
FIG. 24 is a perspective view of a modified version of the hinge assembly of FIG. 23.

FIGS. 23 and 24 illustrate an alternative construction hinge assembly 210 using the articulation joint depicted in FIGS. 1-22. More particularly, hinge 210 is formed with an articulation joint 218, similar to joint 18 (of FIG. 1). A pair of opposed arms 212 and 214 are sprung together with an elastic bungee cord, or spring 216, similar to cord 16 (of FIG. 1). A screw plate leg 222 on arm 214 attaches with screws to an outer surface of a wooden box 213, while a similar screw plate leg 220 (see FIG. 24) attaches with screws to a top surface of a wooden box top 215. As shown in FIG. 24, plates 220 and 224 on respective arms 212 and 214 are held at a 90 degree angle by elastic cord 216 when in an unloaded state. However, by lifting a box cover (see FIG. 23), cord 216 is stretched and plates 220 and 224 move into the same plane as articulation joint 218 moves via coaction of articulating base members 224 and 226 (which operate similar to members 24 and 26 (in FIG. 1).

Figure 25:
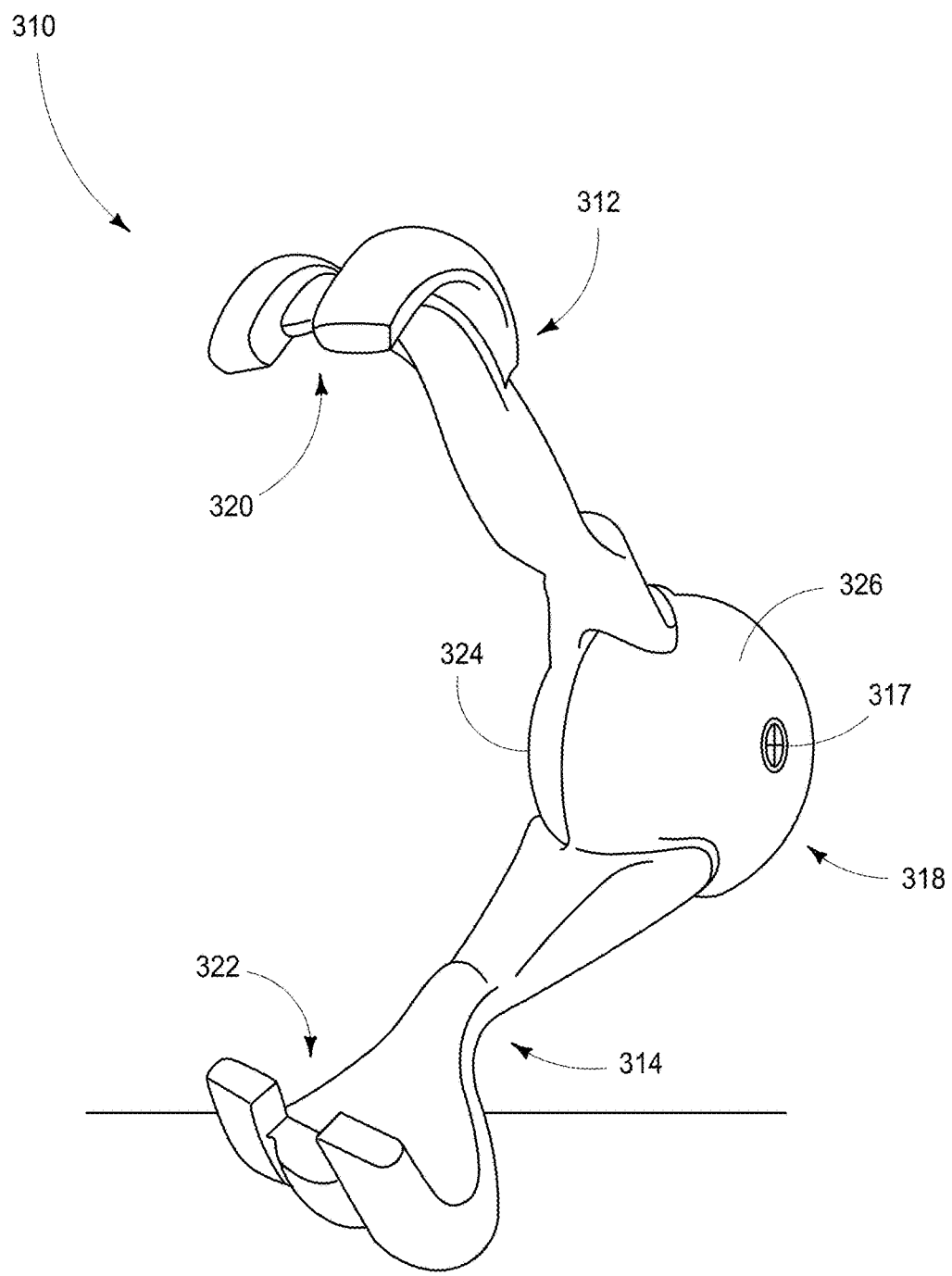
FIG. 25 is a perspective view of another alternative construction for a holder having a rotary hinge and shown in an opened configuration for receiving a portable electronic device.

FIGS. 25-30 illustrate in perspective view another alternative construction for a holder 310 having a rotary hinge 318 and shown in an opened configuration (sprung open) for receiving a portable electronic device (not shown). Clasping arms 312 and 314 and claws 320 and 322 operate in a manner similar to arms 12 and 14 and claws 20 and 22 (of FIG. 1). However, hinge 318 is a rotary hinge that has a pivot axis concurrent with fastener 317, as shown in FIG. 25. Each articulating base member 324 and 326 comprises a semi-spherical part that mates in complementary engagement to form a sphere (with the opposed member).

Figure 26:
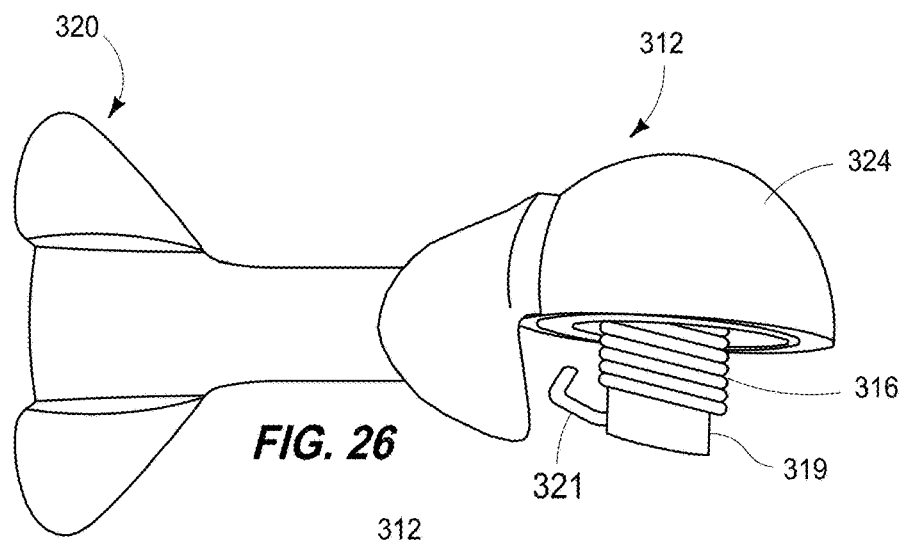
FIG. 26 is a plan view from above of the upper clasping arm from the holder of FIG. 25.
Figure 27:
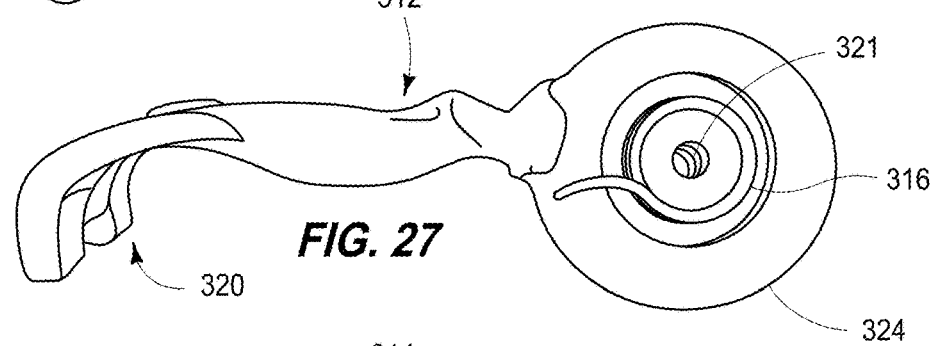
FIG. 27 is a side view of the upper clasping arm of FIG. 26.
Figure 28:
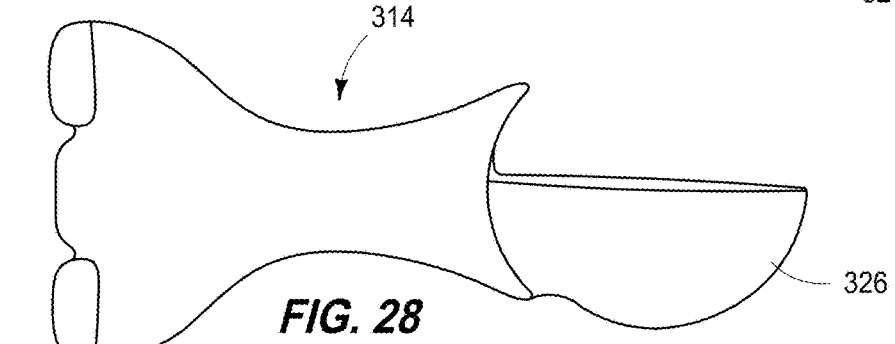
FIG. 28 is a plan view from above of the lower clasping arm from the holder of FIG. 25.
Figure 29:
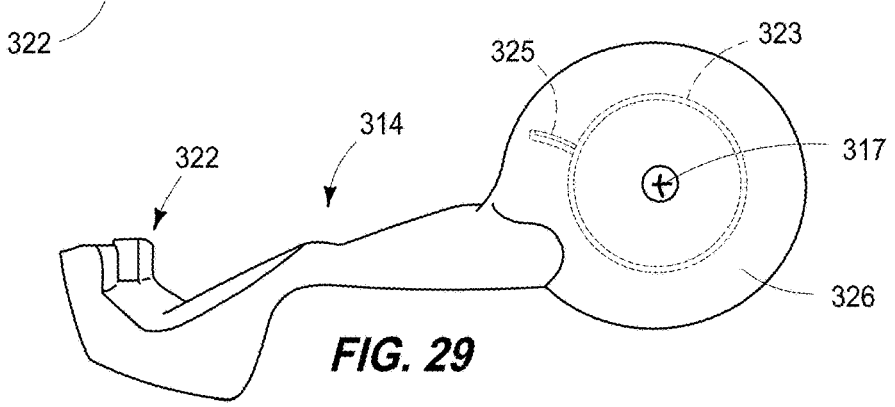
FIG. 29 is a side view of the upper clasping arm of FIG. 28.

As shown in FIG. 26, base member 324 of arm 312 has an integrally formed cylindrical boss, or post 319. A coil spring 316 is received coaxially about post 319 having a dog leg at each end, such as dog leg 321. Another dog leg is provided at an opposite end and is received into a complementary slot at the base of post 319, formed within base 324, trapping the leg and end of the spring from rotating. In assembly, dog leg 321 is rotated, causing spring 319 to uncoil and imparting a closing force on dog leg 321 which imparts relative closure between arms 312 and 314 in assembly. As shown in FIG. 29, a corresponding slot 325 is provided in base 326 to receive dog leg 321 in assembly. Slot 321 communicates with a central cylindrical clearance chamber 323 formed in base 326 to receive spring 316 and post 319 (see FIG. 26) in assembly. As shown in FIG. 27, a threaded bore 321 is provided centrally of base 324 and spring 316 on arm 312 A threaded fastener, or machine screw 317 (see FIG. 29) is received in threaded engagement within threaded bore 321 (see FIG. 27) to secure together arms 312 and 314 for pivotal engagement that drives together claws 320 and 322 in assembly. Optionally, a loop can be molded into one or more of bases 324 and 326 to enable attachment of a keychain, lanyard, or retention device onto holder 310. It is also understood that arms 312 and 314 of holder 310 can be made of any suitable structural material, in addition to molded plastic, such as metal, wood, bone, stone, composite, or any other material capable of functioning as a structural material and potentially having aesthetic characteristics.

Figure 30:
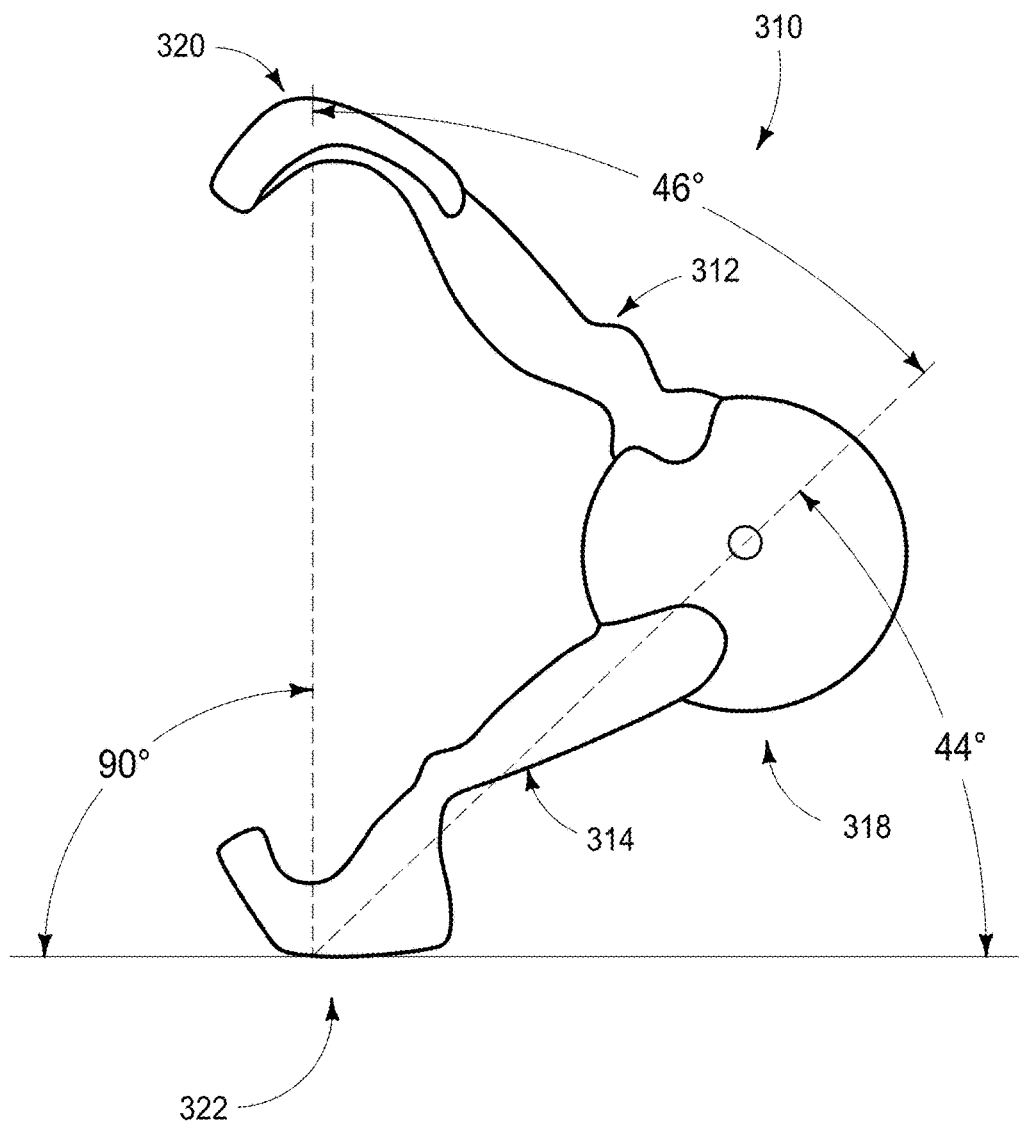
FIG. 30 is a side view of the holder of FIG. 25 further depicting one desirable geometry.

A shown in FIG. 30, holder 310 has one desirable geometry found suitable for holding mobile phones, tablet computers, navigation devices and GPS units, as well as any other suitable portable electronic device. Claw 322 is shown supported by a respective platform base on a horizontal surface (not shown) with claw 320 urged to an open position corresponding with a position that would hold a mobile phone. Hinge 318 is urged to an open position, while applying spring force to urge back together claws 320 and 322 (to hold a device there between). When released (without holding a device), claw 320 will overlie claw 322.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

We claim:
1. A holder for a portable electronic device, comprising:
 a first clasping arm having an articulating base member having a pair of spaced apart ovoid articular surfaces forming a y-shaped hinged joint member spanning an elliptical cavity at a proximal end, an edge engagement portion at a distal end, and a receiving groove;
 a second clasping arm having a complementary articulating base member at a proximal end, an edge engage- ment portion at a distal end, and a receiving groove, the base member of the second clasping arm cooperating in assembly with the base member of the first clasping arm to define an articulating joint between the first clasping arm and the second clasping arm with the receiving groove of the first clasping arm and the second clasping arm each offset in a distal direction from the resulting hinge pivot; and an elastic cord retainer received in locked relation within the receiving groove of the first clasping arm and the receiving groove of the second clasping arm while in a stretched state so as to urge together the first clasping arm with the second clasping arm about the articulating joint.

2. The holder of claim 1, wherein the articulating base member of the second clasping arm comprises an ovoid articular surface provided along a central proximal end portion of the second clasping arm and sized to be received in articulating engagement in assembly within the elliptical cavity between the pair of spaced apart ovoid articular surfaces on the first clasping arm.

3. The holder of claim 1, wherein the articulating base member of the second clasping arm comprises an ovoid articular surface provided along a central proximal end portion of the second clasping arm and sized to be received in articulating engagement in assembly between the pair of spaced apart ovoid articular surfaces on the first clasping arm.

4. The holder of claim 1, wherein the articulating base member of the second clasping arm comprises a central protrusion and a pair of laterally extending projections provided distally of the protrusion, extending outwardly in opposed relation to one another, and each having an ovoid articular surface configured to mate with a respective one of the spaced apart ovoid articular surfaces of the first clasping arm.

5. The holder of claim 1, wherein the articulating base member of the first clasping arm cooperates in assembly with the articulating base member of the second clasping arm to provide a compound joint imparting movement in two planes.

6. The holder of claim 1, wherein the articulating base member of the first clasping arm comprises a y-shaped yoke.

7. The holder of claim 6, wherein the articulating base member of the second clasping arm comprises a central protrusion and a pair of laterally extending projections provided distally of the protrusion and extending outwardly in opposed relation to one another.

8. A holder for a portable electronic device, comprising:
a first clasping arm having an articulating base member at a proximal end and an inwardly curved edge engagement portion at a distal end;

a second clasping arm having a complementary articulating base member at a proximal end and an inwardly curved edge engagement portion at a distal end, the base member of the second clasping arm cooperating in assembly with the base member of the first clasping arm to define an articulating joint between the first clasping arm and the second clasping arm; and an articulation joint comprising the articulating base member of the first arm and the articulating base member of the second arm seated together in assembly;

the articulating base member of the first arm comprises a pair of spaced apart ovoid articular surfaces forming a y-shaped hinged joint member spanning an elliptical cavity and the articulating base member of the second arm comprises an ovoid articular surface provided along a central proximal end portion of the second clasping arm and sized to be received in articulating engagement in assembly within the elliptical cavity between the pair of spaced apart ovoid articular surfaces on the first clasping arm, wherein the articulating base member of the second clasping arm further comprises a central protrusion and a pair of laterally extending projections provided distally of the protrusion, extending outwardly in opposed relation to one another, and each having an ovoid articular surface configured to mate with a respective one of the of spaced apart ovoid articular surfaces of the first clasping arm, and an elastic cord retainer received within a receiving groove of the first clasping arm and a receiving groove of the second clasping arm while in a stretched state so as to urge together the first clasping arm with the second clasping arm about the articulating joint.

9. The holder of claim 8, wherein the inwardly curved edge engagement portion of the first clasping arm overlies the inwardly curved edge engagement portion of the second clasping arm when the first clasping arm is nested in engagement with the second clasping arm.

10. The holder of claim 8, wherein the second arm comprises a platform base provided in proximity with the articulation joint.

11. The holder of claim 10, wherein the platform surface comprises a fixture for affixing the holder to a support surface.

12. The holder of claim 11, wherein the fixture comprises at least one of: a) a magnet; and b) a female threaded aperture.

13. The holder of claim 8, wherein at least one of the first arm and the second arm comprise a frictionable portion.

14. The holder of claim 8, wherein the elastic cord retainer comprises a continuous loop of elastic cord.

* * * * *